United States Patent [19]
Dushane et al.

[11] Patent Number: 6,032,867
[45] Date of Patent: Mar. 7, 2000

[54] FLAT PLATE THERMOSTAT AND WALL MOUNTING METHOD

[76] Inventors: Steve Dushane, 17170 Los Alimos St., Granada Hills, Calif. 91344; Terry Zimmerman, 10810 Springfield, Northridge, Calif. 91324; Grant Bohm, 19540 Sherman Wy., Reseda, Calif. 91335; John Staples, 25751 Dillon, Newport Beach, Calif. 92657

[21] Appl. No.: 09/152,211

[22] Filed: Sep. 11, 1998

Related U.S. Application Data

[63] Continuation-in-part of application No. 09/063,512, Apr. 21, 1998, and application No. 09/079,326, May 14, 1998.

[51] Int. Cl.[7] ............................. F23N 5/20; H01H 37/04
[52] U.S. Cl. ...................... 236/51; 236/46 R; 236/78 R; 337/398
[58] Field of Search ............................. 236/51, 46 R, 236/68 B, 74 R, DIG. 19, 78 R; 337/398, 327

[56] References Cited

U.S. PATENT DOCUMENTS

| D. 329,617 | 9/1992 | Tinz | D10/51 |
|---|---|---|---|
| D. 333,656 | 3/1993 | Bluemel et al. | D13/162 |
| 4,587,403 | 5/1986 | Shapess | 236/68 B X |
| 4,775,100 | 10/1988 | Gouldey et al. | 236/68 B X |
| 5,268,664 | 12/1993 | Givler | 337/380 |
| 5,381,950 | 1/1995 | Aldridge | 236/DIG. 19 X |
| 5,485,954 | 1/1996 | Guy et al. | 236/78 R |
| 5,558,436 | 9/1996 | Richards | 236/DIG. 19 X |
| 5,592,989 | 1/1997 | Lynn et al. | 165/259 |

*Primary Examiner*—William Wayner

[57] ABSTRACT

The present invention provides preferably one or optionally two printed circuit boards that project from supports on a single cover plate into the wall opening formed preferably for a standard 3.5 inch by 2 1/16 inch junction or outlet box. Screw holes are provided in the cover plate to match the standard screw holes in the single junction box and a high degree of functionality is provided in the programmable thermostat via the components on the printed circuit board such that the printed circuit boards are about only as long as the distance between those screw holes and still fit within the width of the single junction box.

20 Claims, 22 Drawing Sheets

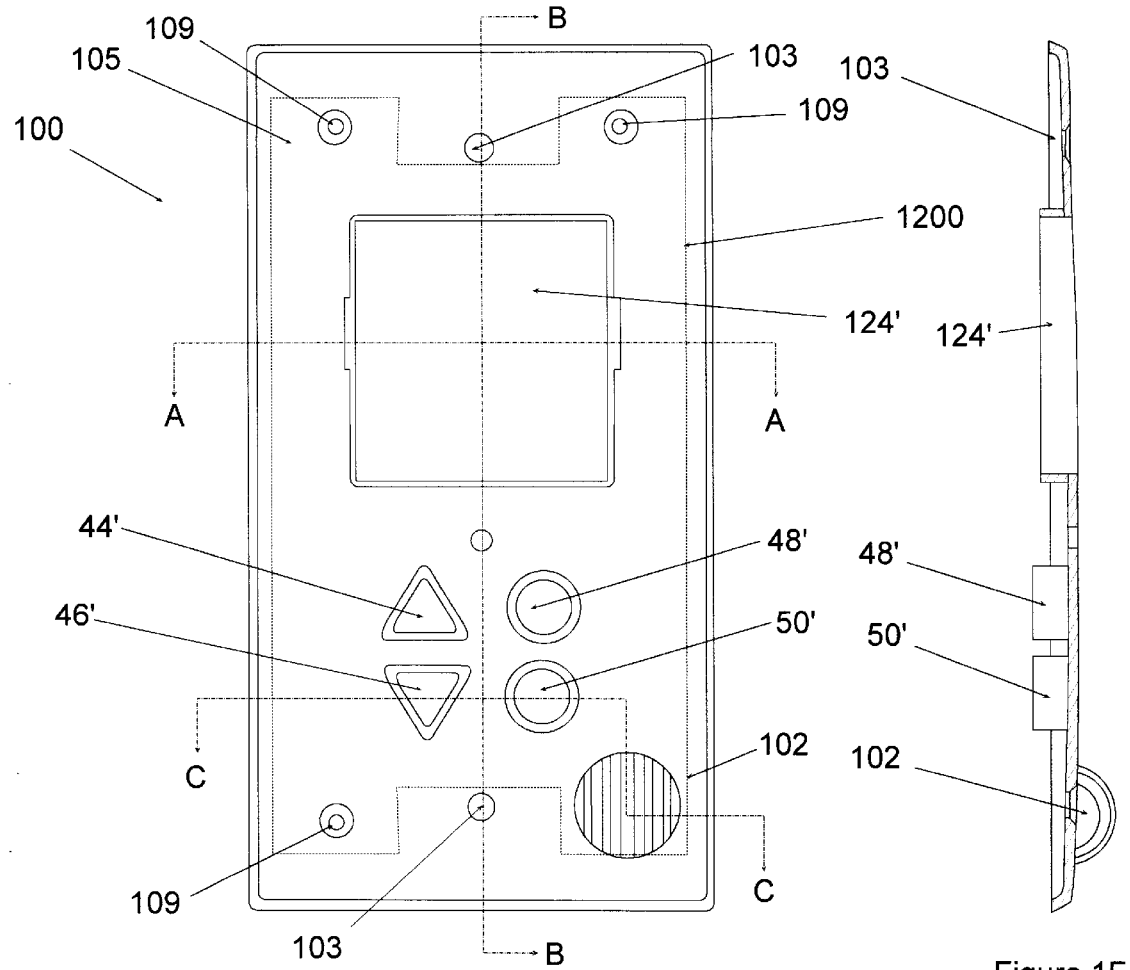
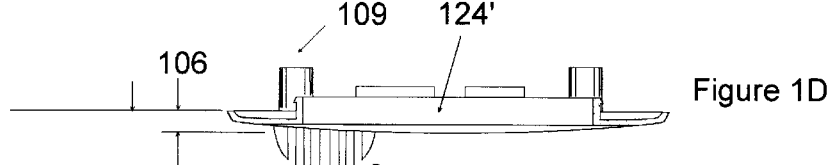
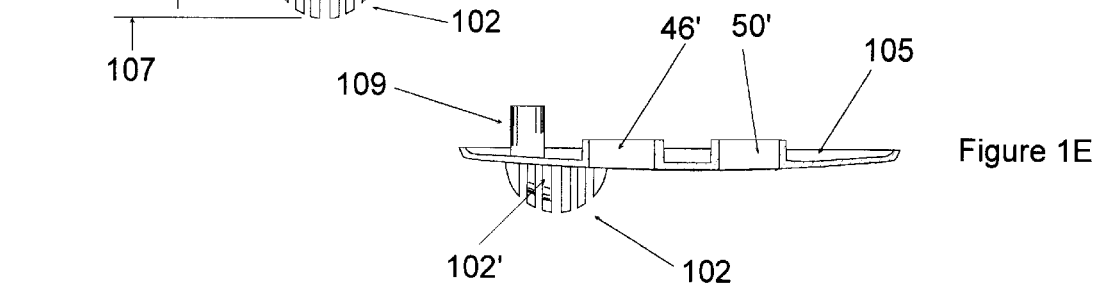

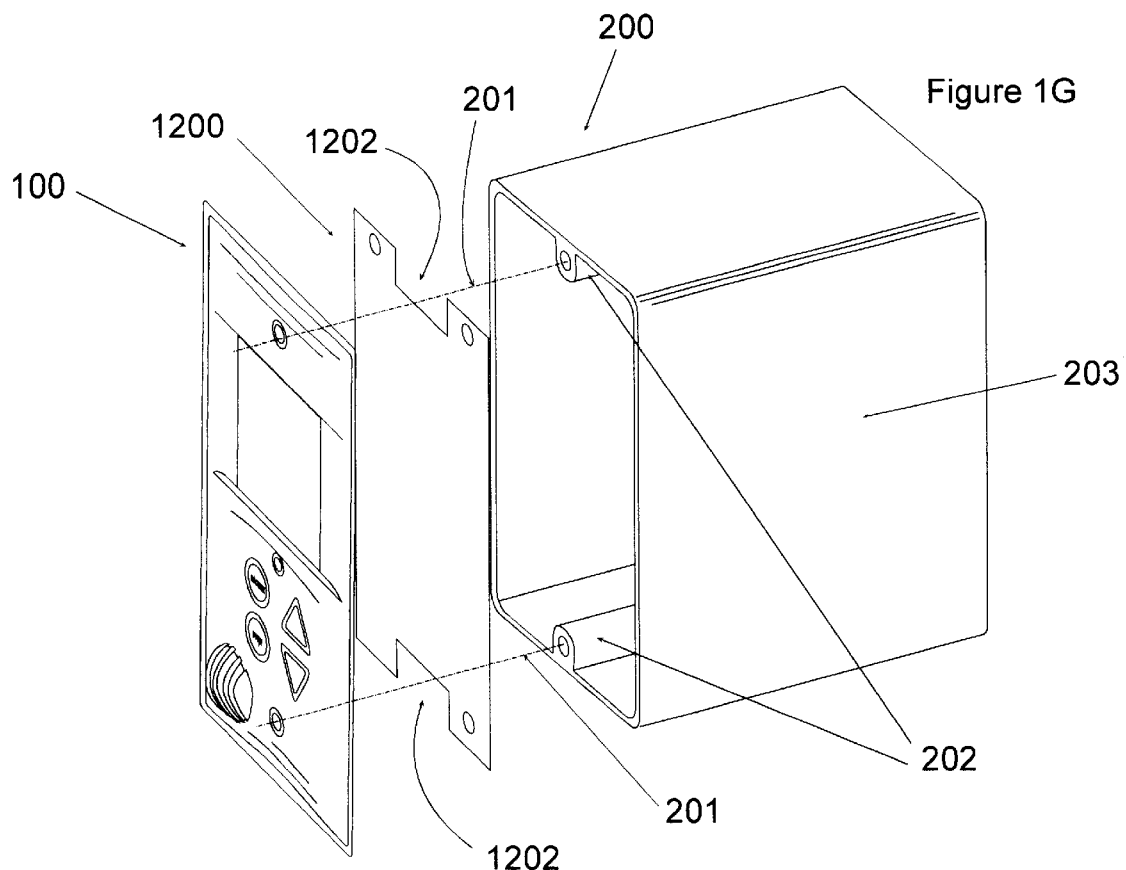
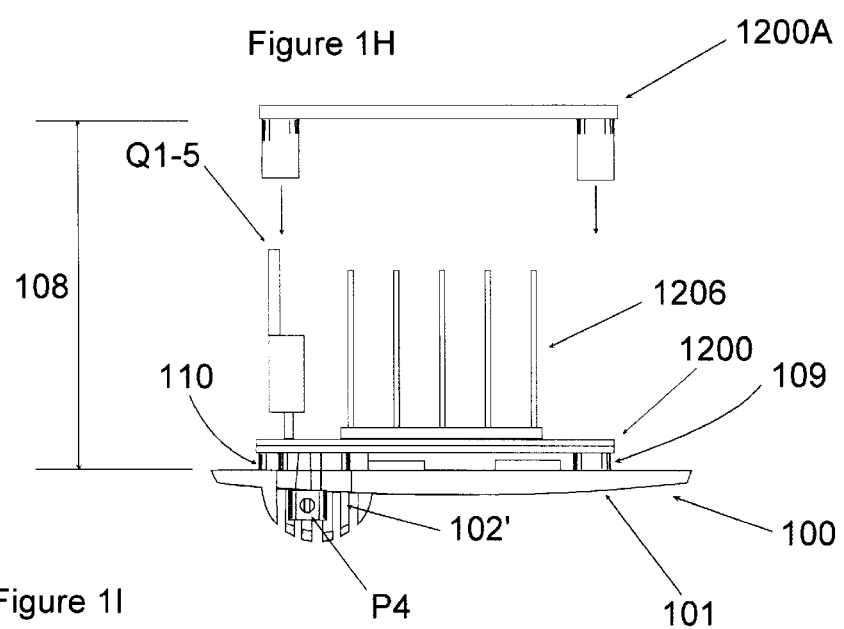

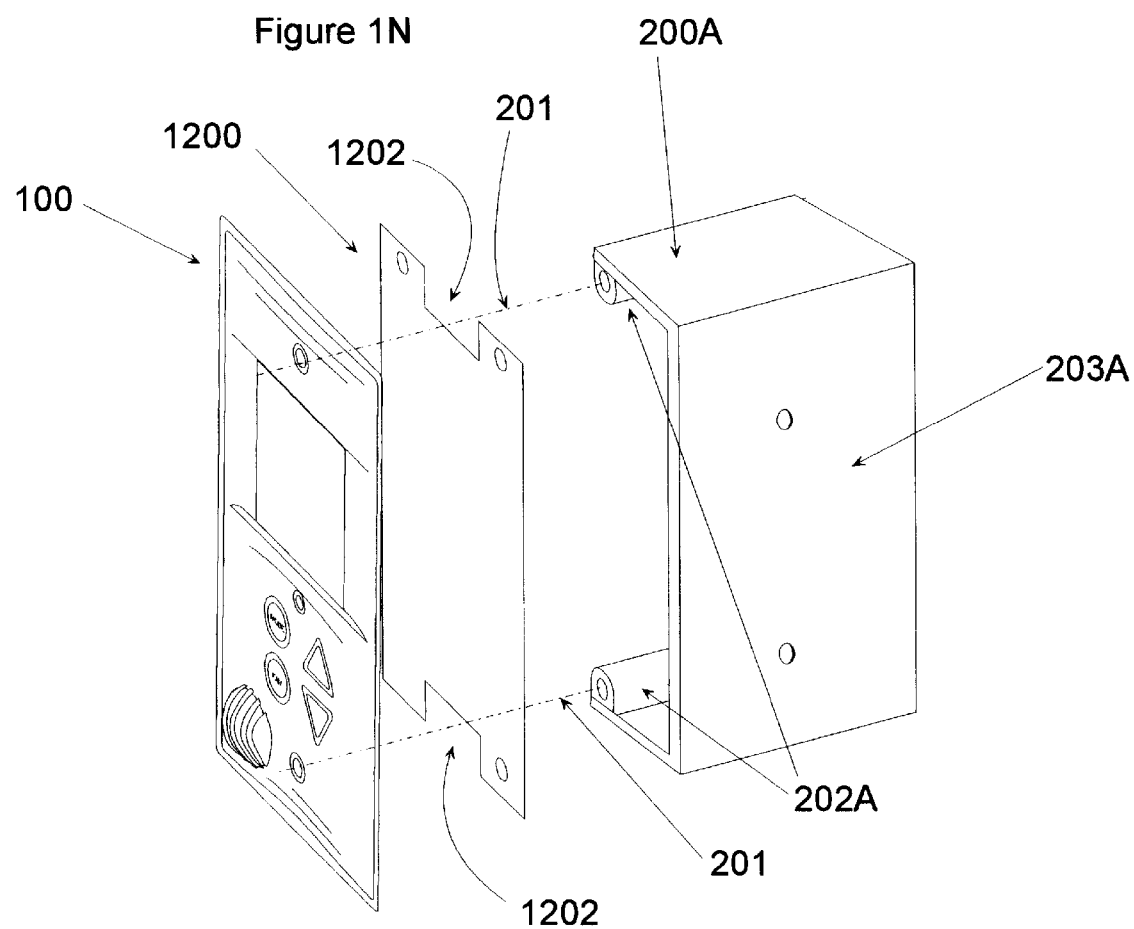

(1 OF 3)

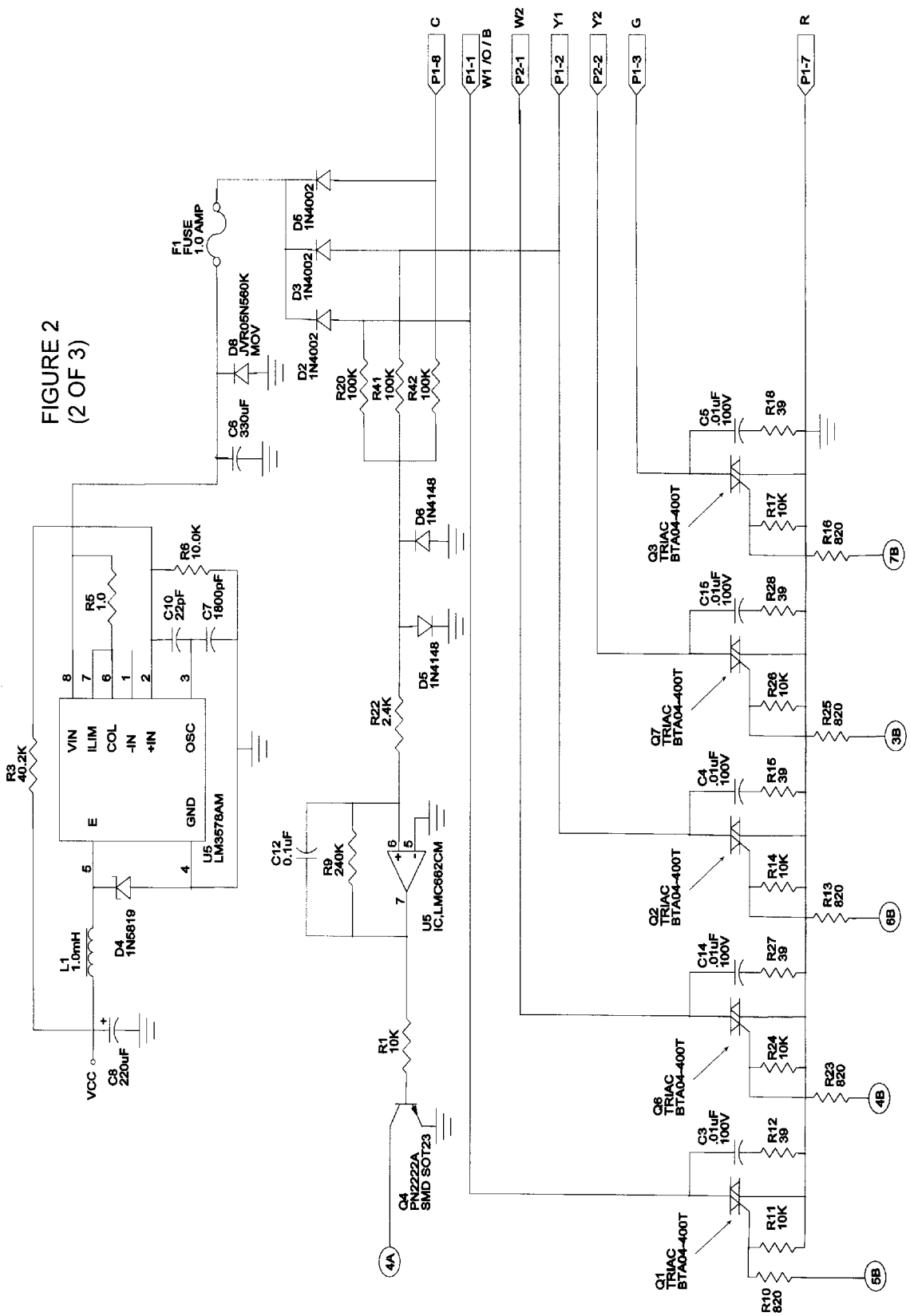
FIGURE 2 (2 OF 3)

FIGURE 2
(3 OF 3)

FIGURE 4
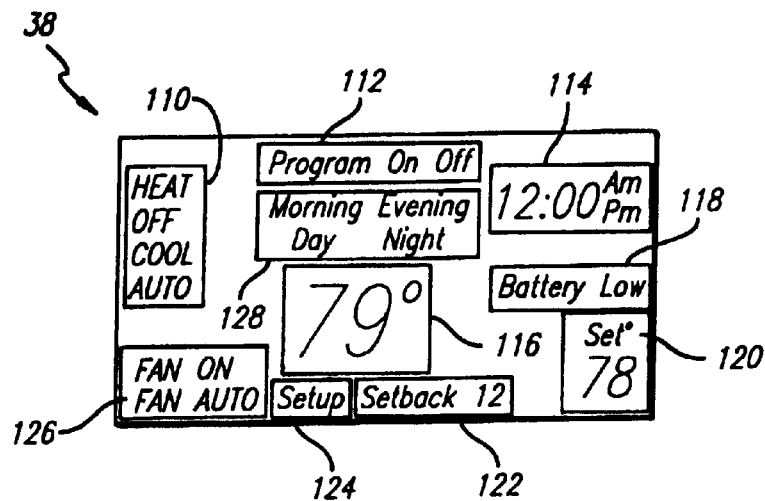
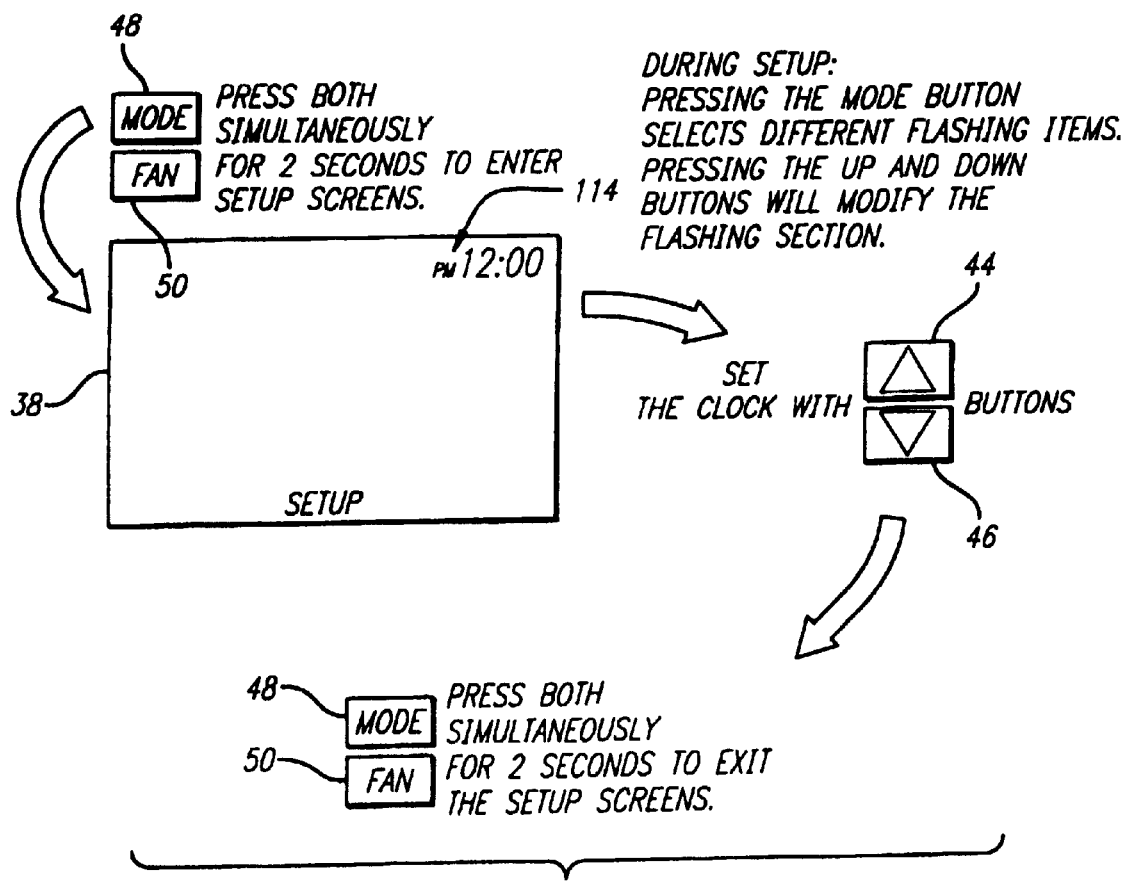
FIGURE 5

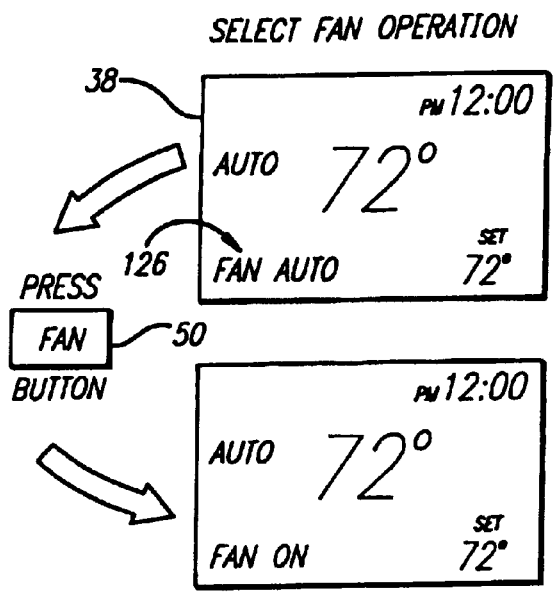
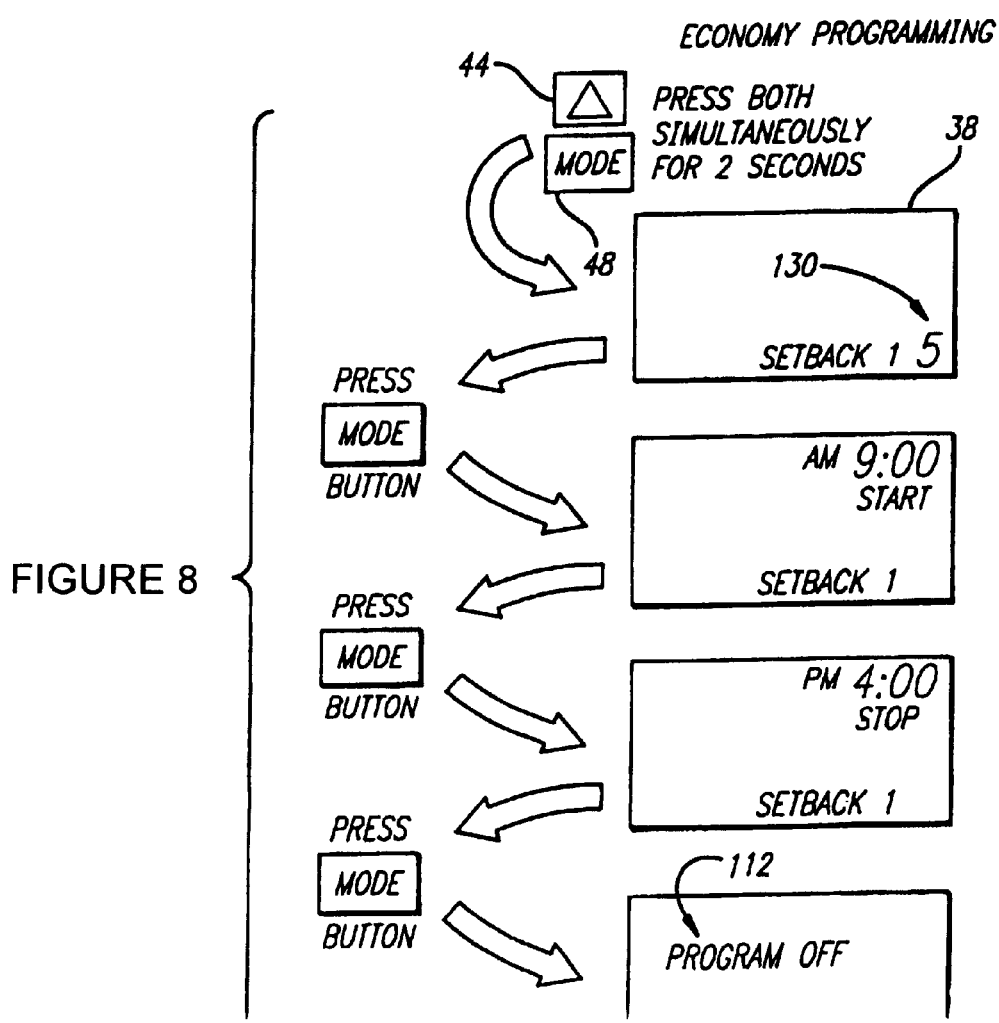

(1 OF 3)

(2 OF 3)

(3 OF 3)

FLAT PLATE THERMOSTAT AND WALL MOUNTING METHOD

This application is a continuation in part of Ser. No. 09/063,512 filed Apr. 21, 1998 and Ser. No. 09/079,326 filed May 14, 1998.

BACKGROUND OF THE INVENTION

The present invention relates to sensors utilized to sense the temperature of a zone for control of a heating, ventilation, and air conditioning (HVAC) system, the sensor contained in an assembly of an extremely low profile, wall mounted thermostat having a cover located over one or two component and connector boards.

BACKGROUND OF THE INVENTION

Thermostats have long been used to control HVAC systems. Such thermostats are typically mounted on a wall in the space or zone that is being heated or air conditioned at approximately five feet of height from the floor. The term "flush mounting" in the art typically means that a thermostat has an enclosing case with a front and a back surface, the back surface having a large flat face that is installed securely immediately adjacent to a supporting wall.

Aesthetic considerations exert a major influence on the design of thermostats that are to be used in occupied zones and spaces, including homes and office spaces. For such uses, it is desirable that the thermostat be as unobtrusive as possible. A principle consideration is that the thermostat project from the mount on the wall into the space as little as possible. From the standpoint of acceptance in the marketplace, a thermostat having a minimal profile, as measured between the wall on which the thermostat is mounted and the outer surface of the cover, is much preferred over a thick thermostat the provides the same functional capabilities.

A minimal profile thermostat has both functional and safety advantages, as well as being aesthetically pleasing. For instance, such a thermostat is less likely to be accidentally bumped by traffic in the room in which the thermostat is installed. The impact of such inadvertent contact may be enough to dislodge the thermostat from its mount on the wall or to dislodge the cover from the subbase. In U.S. Pat. No. 5,485,954, a reduced profile thermostat is described wherein the entire case, including the cover and subbase, are taught to be installed with "flush mounting" as described above.

With respect to US Patents D333656 and D329617 and show other prior art thermostats with reference to the projection of case from the mounting wall after installation.

U.S. Pat. No. 5,268,664 describes a device intending to reduce projection height of a bimetal temperature sensor as part of another unit. The teaching of this method of height reduction also comprises forming an encapsulating case whereby the substantial flat back surface is mounted to the support wall. As is typical of prior art thermostats, also shown in U.S. Pat. No. 5,592,989, consistent with the requirements of providing an encapsulating case, the above patents show that the designer must have at least one printed circuit board for location of substantially all the operational components of the thermostat located between at least a cover plate and a back plate with a protecting flat back surface, such protecting back surface installed immediately adjacent and positionally outside of the vertical mounting wall.

SUMMARY OF THE INVENTION

With respect to low profile thermostats, it is unknown in the prior art to project past and into the vertical mounting support wall a substantial portion of the at least one printed circuit board for location of substantially all the operational components of a programmable thermostat. The present invention comprises that adaptation. The present invention provides preferably one or optionally two printed circuit boards that project from supports on a single cover plate into the wall opening formed preferably for a standard 3.5 inch by 2 1/16 inch junction or outlet box. Screw holes are provided in the cover plate to match the standard screw holes in the single junction box and a high degree of functionality is provided in the programmable thermostat via the components on the printed circuit board such that the printed circuit boards are about only as long as the distance between those screw holes and still fit within the width of the single junction box.

It is well understood in the art to provide an opening in a wall and mount in alignment with the opening a standard single junction box. It heretofor unknown to use that junction box alone as the cavity into which the printed circuit boards, operatively connected to a single cover plate, extend for protection during operation. With that assembly and method of operation, the projected height of the reduced profile thermostat of the present invention is less than about 0.5 inches, and is more preferably about 0.25 inches or less. The desired projected height of the cover plate of the thermostat of the present invention depends in part on at least a small, rounded projection from the surface of the cover plate with air draft slots for presentation of a temperature sensing component for adequate sensing of the room temperature.

Thus, with the exception of the presentation extension for a temperature sensing component, an alternate embodiment of the present invention includes a cover plate wherein most of the flat surface of the cover plate is at substantially the same plane as the exterior of the support wall on which the thermostat is mounted. The portions of the cover plate which must extend at least slightly above that plane are the presentation extension for a temperature sensing component and a rim section rising slightly above that plane for covering the wall opening edge.

As disclosed in another pending application, Ser. No. 09/079326 filed May 14, 1998, which is incorporated herein by reference, the reduced profile thermostat of the present invention may be further reduced in external features to eliminate any push buttons, dials, adjustment controls or, optionally, a display screen. In its most minimal presentation, a hand held programming device according to the above application may communicate with a IR or sonic receiving device and an associated programmable or program-storing thermostat resident on the printed circuit boards of the present invention such that no display screen or indicators are present and the only visible signs that beneath the cover plate an thermostat might lie behind it are a small projection for presentation extension for a temperature sensing component and some vent slots, darkened face plate or small bulb extension for a receiver for IR or sonic transmissions thereto, or other such wireless transmissions.

With visible projection of the thermostat cover plate reduced to such a minimal height, adaptation of the coloring and design may be accomplished as are widely practiced for simple light switch and electrical outlet cover plates, i.e., they may be covered substantially with matching wall paper or made with a coordinating polymer cover so long as the temperature sensing function and/or wireless program reception or transmission is not impaired.

It is an alternate embodiment of the present invention to provide a high degree of functionality for programmable thermostats on a single, four-layer printed circuit board with length of about 85 mm and a width of about 45 mm. The extensive functionality of the programmable thermostat described below and in the above application is provided with push-button on a front face and two low voltage plug-in modules on a back face all on an integrated printed circuit board small enough to operatively fit within the vertical cross section of the standard single junction box.

It is another embodiment of the present invention to retrofit existing switch or outlet boxes to thermostat locations or to convert an existing 2-switch or 4-outlet double gang box such that two switches or outlets are combined in the same double gang box with the thermostat of the present invention.

BRIEF DESCRIPTION OF THE DRAWINGS

FIG. 1C is a back view of one embodiment, generally the most highly featured thereof, of the low profile cover plate of the present invention.

FIGS. 1D, 1E and 1F are sections AA, CC and BB of FIG. 1C respectively.

FIG. 1G shows an exploded view of the assembly of the cover plate, representative printed circuit board and single switch box for one embodiment of the present invention.

FIG. 1N is an alternate embodiment of the single switch box support means for the assembly of the cover plate and circuit board as assembled in FIG. 1G, whereby enclosure of the circuit board is eliminated and only support for the assembly is provided necessary to connect it to a nearby stud.

FIGS. 3–11 correspond to those same Figures of co-pending patent application Ser. No. 09/079326 filed May 14, 1998 and is hereby incorporated herein FIG. 3 is an electrical schematic of the transmitter programming unit.

FIG. 4 shows a display portion of a transmitter unit.

FIG. 5 shows the display portion of the transmitter unit during execution of a quick start software module.

FIG. 6 shows the display portion of the transmitter unit during execution of a basic programming mode software module.

FIG. 7 shows the display portion of the transmitter unit during execution of a fan operation control software module.

FIG. 8 shows the display portion of the transmitter unit during execution of an economy programming mode software module.

FIG. 9 shows the display portion of the transmitter unit during execution of an advanced programming setup software module.

FIG. 11 is an electrical schematic of the receiver controller unit.

DETAILED DESCRIPTION OF THE INVENTION

With respect to Figures with designations of electrical components, the electrical components are shown with preferred ratings or specifications below the component label. The component labels are designated with an "R" for resistors (whereby the rating is shown in Ohms), a "C" for capacitors, a "D" for diodes, a "K" for relays, an "ISO" for iso-optical coupler, a "Q" for transistors, a "U" for integrated circuits, an "L" for inductors, a "Y" for resonators, a "T" for transformers, an "S" for switches, and other appropriate designations as are well known in the art.

In accordance with the descriptions of the present invention, a programmable digital thermostat includes a user input mechanism adapted to receive programming inputs from users, to have a display adapted to display indicia of the programming inputs, a controller adapted to be programmable in response to the input signals according to a plurality of programming modes and to generate and provide control signals to one or more environmental control apparatuses. The controller is adapted to facilitate automatic adjustments in control variables associated with at least one of the programming modes.

Figure 1A:
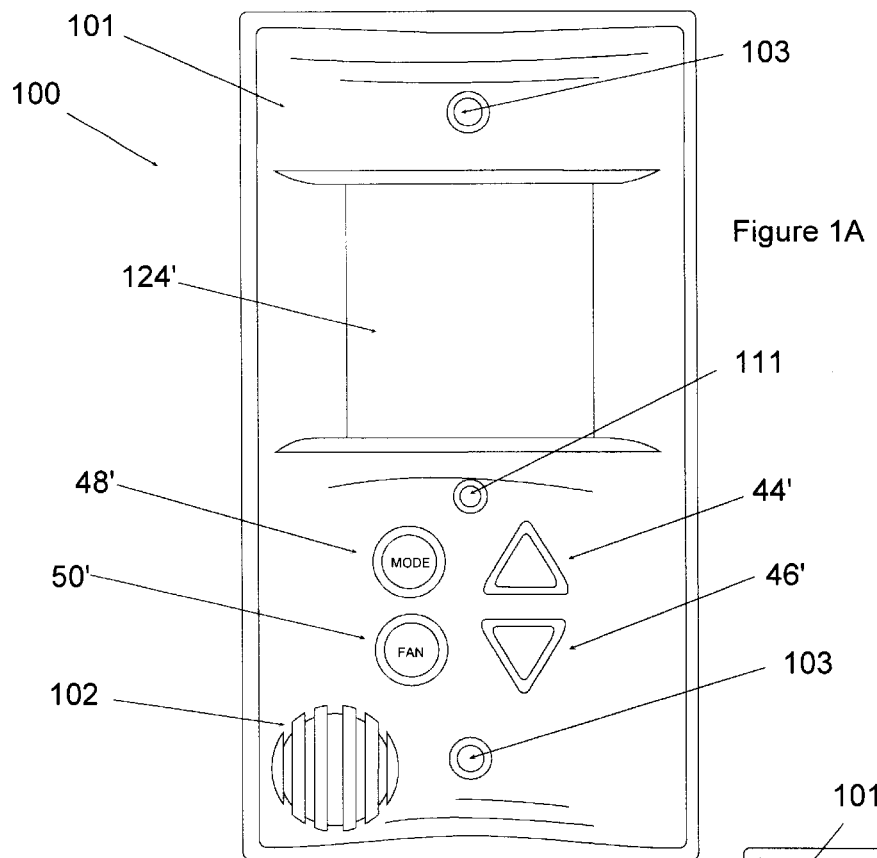
FIG. 1A is a front view of one embodiment, generally the most highly featured thereof, of the low profile cover plate of the present invention.

FIG. 1A shows the front of cover plate 100 with approximate height, width, single switch box coverage and mounting characteristics as that of the typical single light switch or two outlet plate widely used in most current residential and commercial construction. The prior art has not heretofor achieved such low profile presentation of a cover plate for a thermostat. Front face 101 comprises a number of openings for various thermostat programming, information display and temperature sensing operations. Generally rectangular opening 124' (about a height and width of about 1.3 inches by 1.5 inches) corresponds to the opening in which is supported the LCD display of the temperature and time information and programming interaction described below. Holes 103 correspond to in alignment to the top and bottom screw securing holes in the standard single switch box 200 as shown in FIG. 1G, whereby screws passing through holes 103 will supportively engage the screw holes in switch box 200 and thereby providing all the mounting support for the programmable thermostat of the present invention.

The height and width of the front face 101 of the of one preferred embodiments of cover plate 100 shown in FIGS.

1 and 2 are about 4.3 inches by 1.9 inches. Openings 44', 46', 48' and 50' correspond to the openings for passage from the switch contacts S1–S4 on the circuit board to easy user access of the buttons 44, 46, 48 and 50 provided for programming and information as described below. An opening 111 is made for a two color indicator diode.

Figure 12:
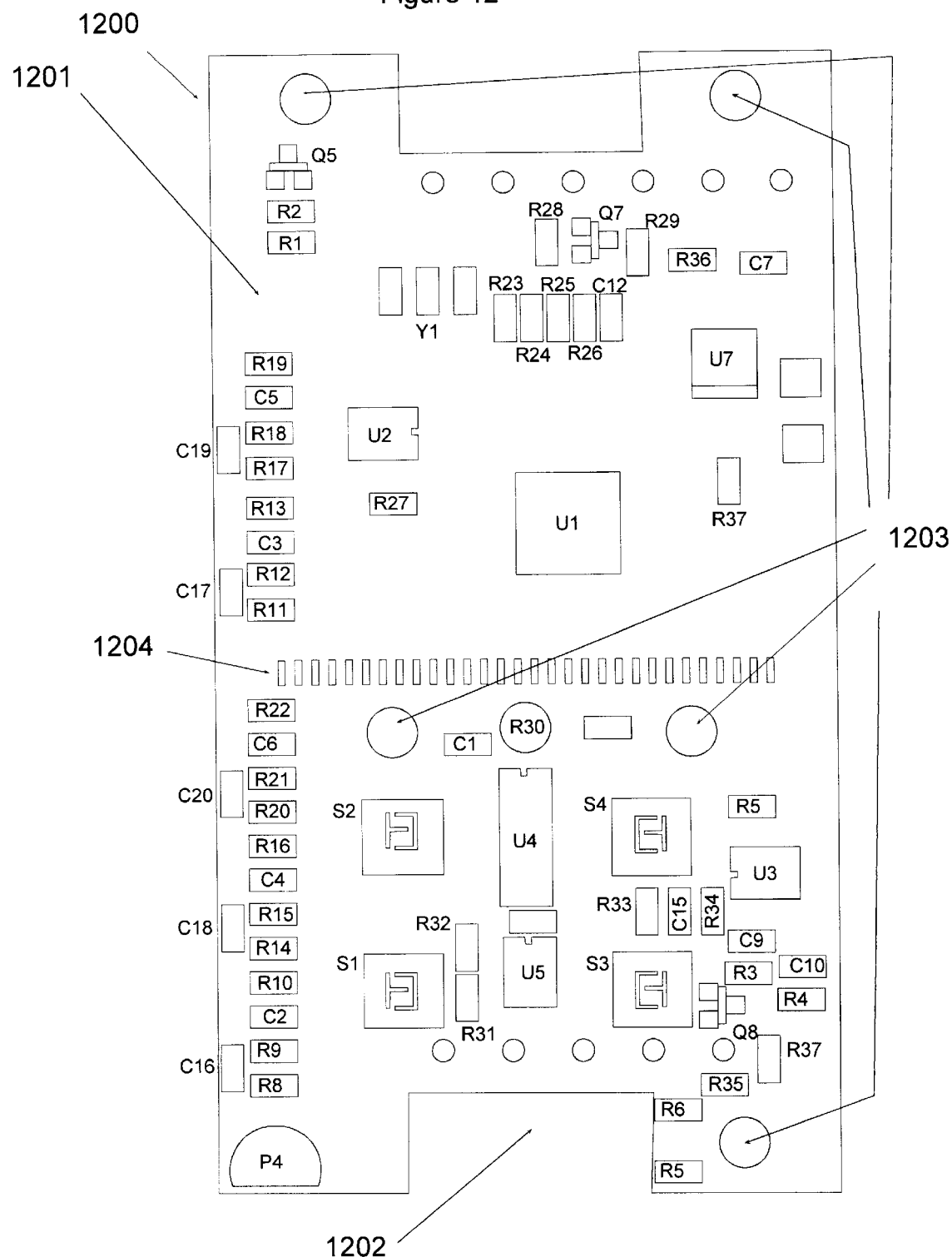
FIG. 12 is the front face of the four layer circuit board of the present invention.
Figure 13:
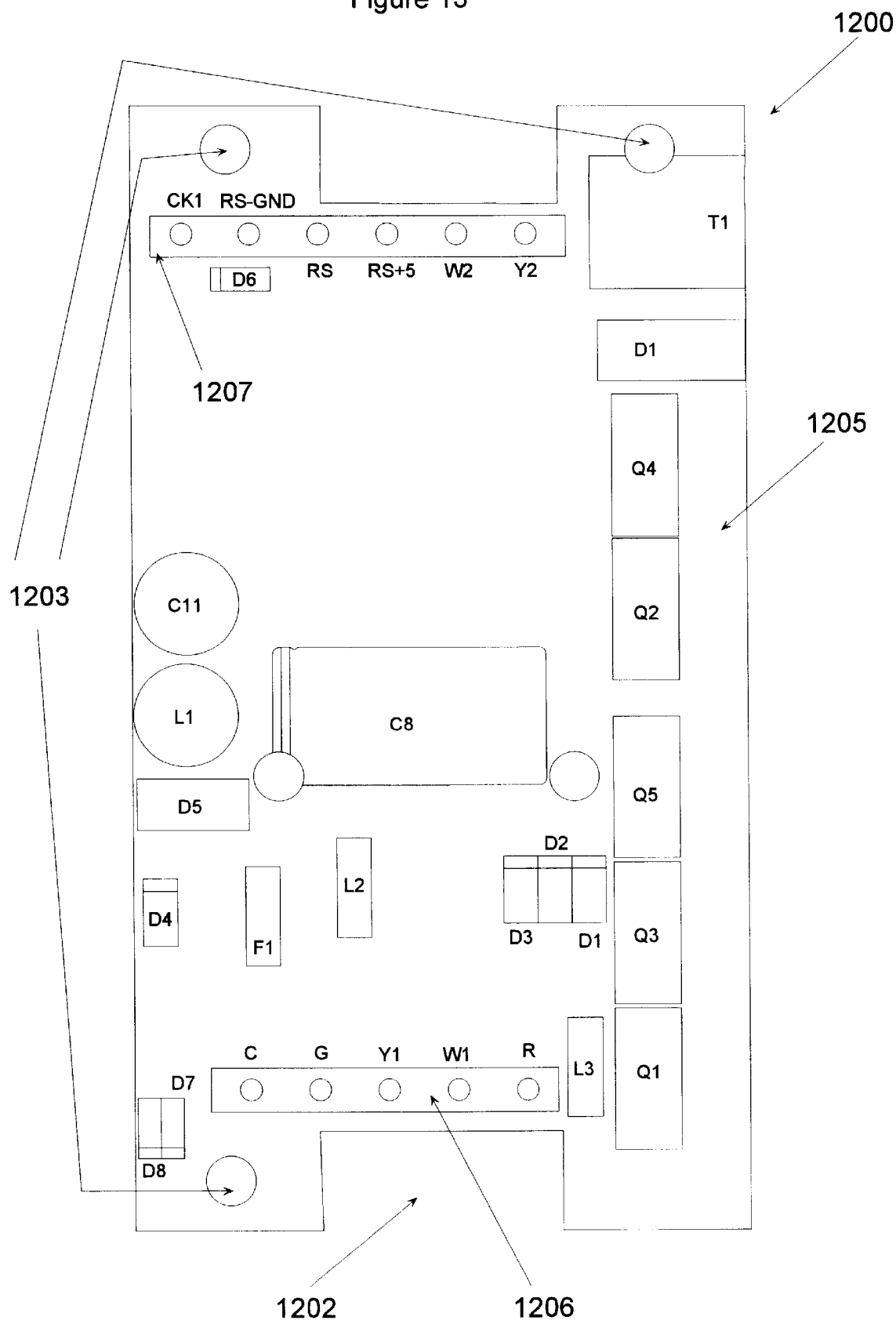
FIG. 13 is the back face of the four layer circuit board of the present invention.

A slotted extension opening 102 is made to provide a small backside cavity in which a temperature sensing component P4 (as in FIG. 12) is located after extending from the adjacent circuit board 1200 (as in FIGS. 12 and 13). The location of this opening 102 is preferred at the lower section of the cover plate, although, as described with reference to the sealing means 110 as shown in FIG. 1l, the location of this opening 102 with the cavity forming extensions may be placed effectively in almost any position on the cover plate 100. The vertical slots in opening 102 provide natural upward convection for air movement the exterior air space with relation to the mounting wall 300, as shown in cross section in FIG. 1L. The vertical slots on an substantial extension from the average lateral extension height of cover plate 100 are a highly preferred embodiment for the location of the temperature sensing component P4. As may be appreciated in FIGS. 1E and 1l, the cutaway section CC shows the formation of a temperature sensing component cavity 102' which has a lateral extension from the adjacent cover plate surface 101 just sufficient so that the temperature sensing component P4 may effectively receive cover plate-external air flow for ambient temperature detection thereof.

As described above, cover plate 100 and its associated circuit boards to comprise an assembly of a programmable thermostat of the present invention presenting the greatest number of visible features by the passerby or user. Although it is possible to design more features with visible presentation on cover plate 100, the current embodiments of the programmable thermostats that are operable with the interface shown in FIG. 1A and further described below have a very high degree of functionality and generally become more confusing to the average, consumer user with more interface features.

Figure 1B:
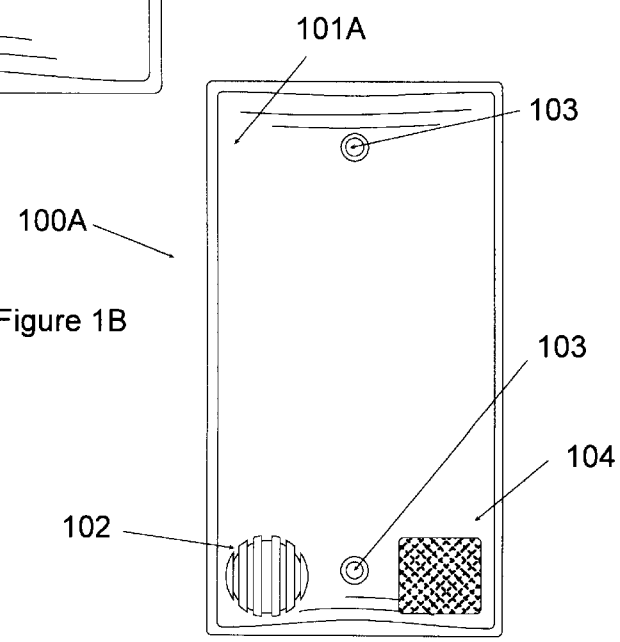
FIG. 1B is a front view of one embodiment, generally the least highly featured thereof, of the low profile cover plate of the present invention.
Figure 1L:
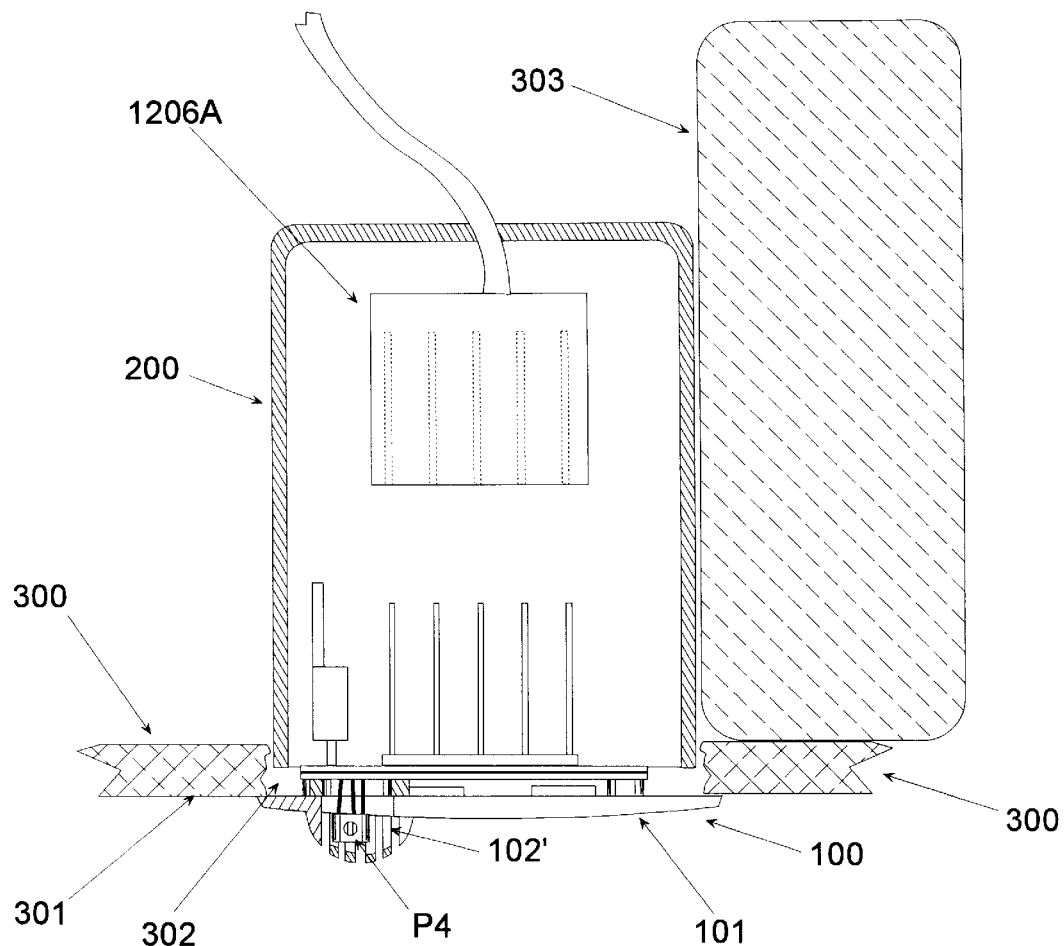
FIG. 1L shows a cut away section of drywall wallboard and adjoining stud, with a cutaway section of the single switch box in an assembled bottom edge view of the cover plate and circuit board of the present invention.

As opposed to the aspect rich embodiment of FIG. 1A, the embodiment of the cover plate 100A of FIG. 1B shows a minimum number of observable aspects of the highly functional programmable thermostat of the present invention with receiver means behind darkened translucent plate 104 only for program reception from a handheld unit with wireless programming means, as described below, and opening 102 for temperature sensing component. Association of the circuit board 1200 or an equivalent with two or more stacked circuit boards as shown in FIG. 1H with the cover plate 100A provides a visual effect heretofor unknown in the prior art, i.e., the casual observer would have no idea that they were looking at a thermostat.

Between the aspect filled embodiment generally represented by cover plate 100 and the aspect depleted embodiment generally represented by cover plate 100A, the skilled person is informed by the disclosure herein of a range of visible aspects that may be presented or deleted for ease and/or visual effect of the user and casual observer.

FIG. 1C shows the backside 105 of cover plate 100, with a broken line outline of circuit board 1200 shown as intended upon securing assembly with the cover plate of the present invention. It will be appreciated by the skilled person upon disclosure herein that the width and height of the cover plate and associated circuit boards necessary for operation of the thermostat of the present invention may be varied to achieve the objects of the present invention. The single switch plate size of the present example is an embodiment optimized for securing of the cover plate and associated circuit board(s) at least partly within a single switch box, as are widely used in the United States at a very low cost.

In observing FIGS. 1D and 1E, openings 124', 46' and 50' are shown with substantial inward extensions from a general cover plate thickness of about 0.08 inches to accommodate, respectively, LCD display 124, DOWN button extension from circuit board 1200 to the user access and the FAN button extension from circuit board 1200 to the user access. Cylindrical extensions 109 have dead end holes along their axes and are provided extending inward toward and providing securable support for the circuit board 1200, a preferable securement being made with screws passing first through holes 1203, as in FIGS. 12 and 13, and then to holes in extensions 109.

With reference to FIG. 1D, the critical lateral height extension of the cover plate of the present invention are now described. Height 106 for one commercial embodiment of the present invention is about 0.18 inches, which is the lateral extension height from the mounting face 301 of wallboard 300, as shown in FIG. 1L. Although this height may be as great as about 0.5 inches with some benefit of reduced visual profile extension for the cover plate over the prior art, it is generally preferred for aesthetic consideration to maintain the height 106 at about 0.25 inches or less. The minimum height 106, as described above with respect to a substantial portion of the cover plate excepting a narrow edge raised section, may be zero or may be recessed to achieve a negative value.

With respect to height 107, a preferred embodiment is about 0.36 inches. This may be somewhat reduced by thinning the covering slots of opening 102, although the projection of this extension beyond the surface 301 of wall 300 is governed by convective heat transfer principles for the temperature sensing component located within cavity 102'. As the height 106 is reduced, height 107 may also be somewhat reduced while maintaining necessary convective air access to the air space in front of wall surface 301. In an alternate embodiment of the assembly of temperature sensing component P4 with the cover plate of the present invention, a closed cell foam ring 110 is shown in broken away form in FIG. 1l. Ring 110 extends in a slightly compressed state so as to form a substantial air seal against flow of air adjacent to the backside 105 or near the slightly heated components on circuit board 1200 to the temperature sensing element of component P4.

With respect to FIG. 1G, cover plate 100, circuit board 1200 and single switch box 200 are shown in an exploded view to facilitate understanding of the method of assembly of the elements of the present invention. Notched out section 1202 is provided for passage of securing screws that will pass along paths 201 from the front face of cover plate 100 through holes 103, past notched out section 1202 to the screw holes 202 to hold up the cover plate and circuit board assembly, such that the outside edges of backside 105 firmly and effectively sealingly are held against wall surface 301 of wallboard 300, as shown in FIG. 1L.

It is important to note that typical installation of a switch box does not usually bring its open face edge flush with surface 301, leaving a usual space 302. The present invention assembly of a cover plate 100 and circuit board 1200 is effective and operable with that defect typical of construction or installation. Circuit board 1200 may be exposed to the raw edges of the wallboard 300 as are caused when a hole is made for access therethrough. In fact, as shown in FIG. 1N, the programmable thermostat of the present invention in all its forms is effective with the alternate bracket 200A to connect to stud 303 for support of the assembly of the cover plate 100 and circuit board 1200. The enclosure of single switch box is not necessary for protection of the circuit board 1200, as long as the wall is as typical and encloses a internal wall space behind wallboard 300.

FIG. 1l shows an assembled bottom edge view of cover plate 100 and circuit board 1200 with the highest backside face extensions of bayonet connections 1206 and transistors Q1–5. The greatest backside extension height needed for full operational assembly of the present invention is increased with addition of the bayonet connection plug 1206A, which will be plugged into bayonet connections 1206 for electrical connection. As the space between the walls of an enclosed wall is typically at least the width of a 2×4 stud, the backside extensions needed for the present invention easily fit therein or in the depth of a standard switch box.

It is an alternate embodiment of the present invention to provide more than one circuit board for location of the electrical components and enable easy location in the just described wall enclosures and/or box depths. In FIG. 1H, upon location of bayonet connections 1206 and transistors on a backside of circuit board 1200A, that circuit board may be connection mechanically and electrically to circuit board 1200 to provide addition component location surface area.

Figure 1M:
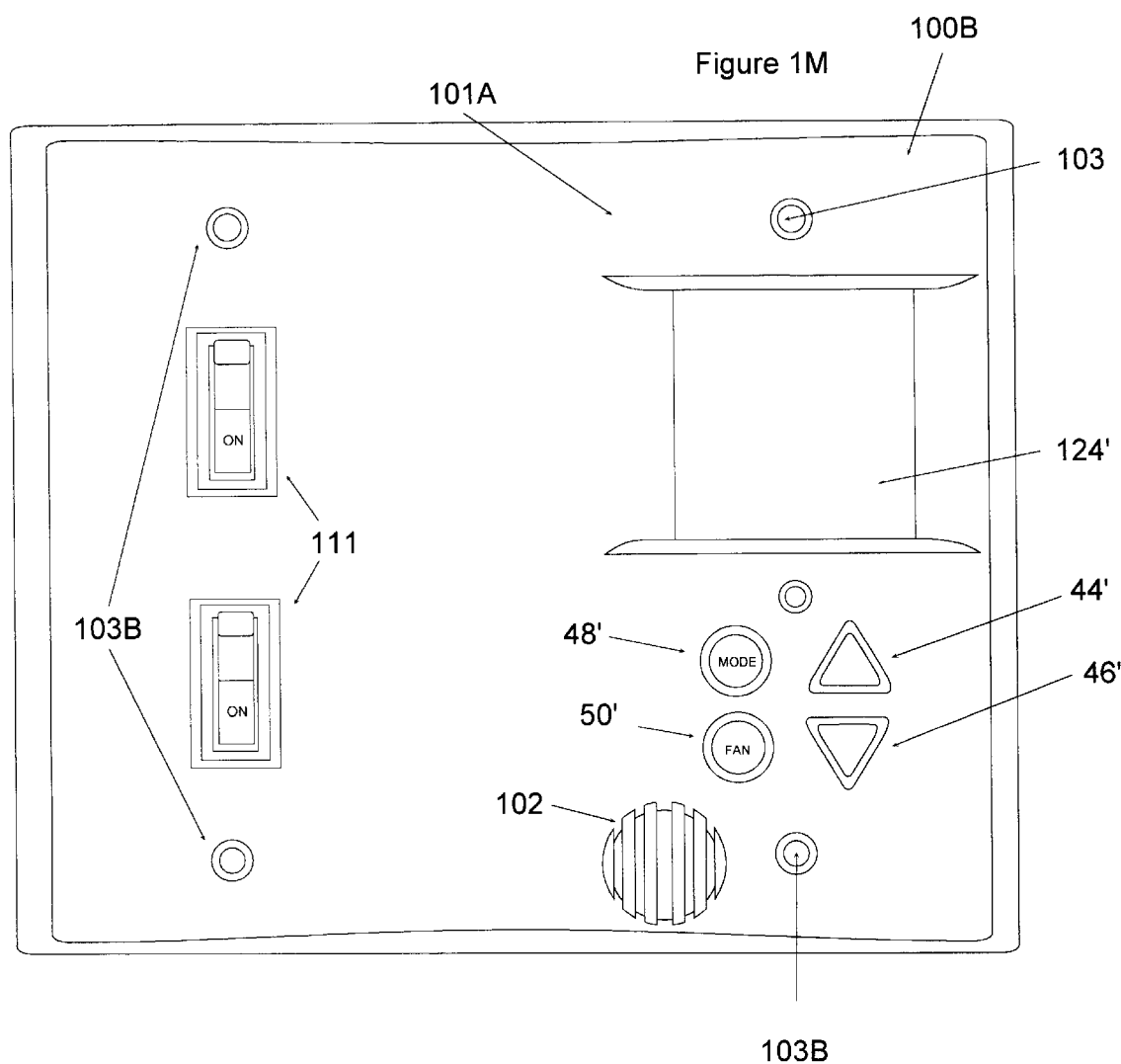
FIG. 1M is an alternate embodiment of the cover plate of FIG. 1A, whereby two light switches are accommodated on the same cover plate as the thermostat of the present invention.

It is an alternate embodiment of the present invention to adapt, as in FIG. 1M, the cover plate of a double light switch with side by side switches to a cover plate 100B with over and under light switches on a left side of a double gang switch box and the covering plate substantially as shown as cover plate 100 as the right portion of cover plate 100B, such that the circuit board 1200 lies immediately and operationally behind that right portion of cover plate 100B. Thus, a single or double gang switch box may be converted to use as a location for the thermostat of the present invention or a new switch box may be installed easily and inexpensively to install the assembly of the cover plate and circuit board of the present invention.

The present invention comprises a high degree of functionality in the programmable thermostats described below with, on a backside 1205 of a four layer circuit board, locations for eleven bayonet connections for equipment control and remote and direct sensor input, several transistors with heat sink extension with, on a front side 1201 of a four layer circuit board, locations for a temperature sensing component, four press button contacts, several IC's, connections 1204 to the LCD screen, and a multitude of other components.

PROGRAMMABLE THERMOSTAT SCHEMATICS OF FIG. 2

Figure 2:
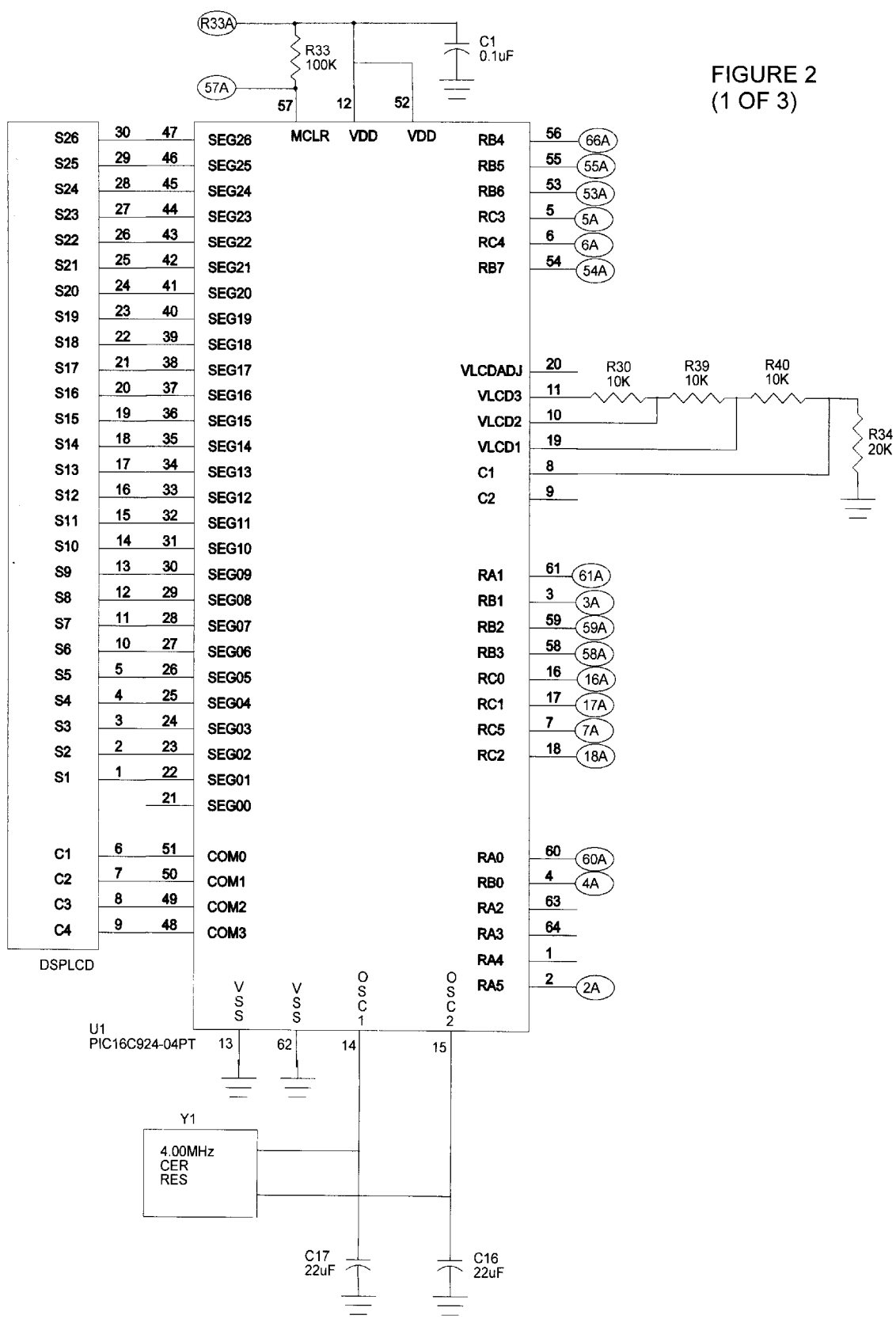
FIG. 2 is a schematic diagram of programmable thermostat of high functionality adapted to accomplish the thermostat programming functions of FIGS. 4–10C, and corresponds to the co-pending patent application Ser. No. 09/063512 filed Apr. 21, 1998, which application is incorporated herein.

With respect to the programmable thermostat schematics of FIG. 2, a display DSPLCD, corresponding to an LCD display for the purposes of the present invention comprises for example, a liquid crystal display with a Thermoglow backlight. A plurality of user input mechanisms which, in the exemplary illustrated embodiment, comprise an indicator light "SINGLE LED" and buttons S1–S4. The interactive programming aspects of the present invention are implemented via the aforementioned user input mechanisms and are described below in greater detail.

Some of the input signals are processed by the programming circuitry and others are supplied to the display DSPLCD. The user inputs, as determined by actuations of the user input mechanisms, are provided to the FIG. 3 electronics. The user inputs may also be provided to microprocessor U1, a temperature sensor U2, buttons S1–S4 (corresponding to buttons 202 of FIG. 1), a lamp SINGLE LED. The display DSPLCD includes a liquid crystal display 203 which is electrically connected to the microprocessor U1 as shown. A crystal Y2 and a ceramic resonator Y1 are also electrically connected to the microprocessor U1 as shown. The crystal Y2 preferably operates at 32.768 kHz and the ceramic resonator preferably resonates at 4.00 MHz. As may be readily appreciated, other timing or clocking schemes can be employed.

The microprocessor U1 is also electrically connected to the temperature sensor U2 via a microprocessor U6. The lamp EL PANEL is electrically connected to the microprocessor U1 via a transistor Q4 and a transformer T1 as shown. The integrated circuit U3 is connected to U1 as shown.

The thermostat may include various combinations of environmental control apparatuses selected from a group comprising, for example, a heater, an air conditioning unit, a fan and heat pump. In the illustrated embodiment, the microprocessor U1 is programmable to expect an electric heat data bit and a heat pump data bit and, in a thermostat including an electric heater and a fan, a data bit is set such that the fan turns on instantly when heat is called for. In a thermostat including a single stage heat pump, a data bit is set such that the control signals generated by the microprocessor U1 are appropriately modified to accommodate a fan, compressor and reversing valve. Thus, another aspect of the present invention is the configurability of the thermostat. It should be appreciated that the thermostat can be modified to control additional and/or other apparatuses and devices such as a two-stage heat pump can be alternatively employed. Exemplary operating modes for the thermostat are discussed below in greater detail.

As shown in FIG. 2, the electronics also include control signal terminals R, C, W1/O/B, W2, Y1, Y2 which are electrically connected to the environmental control apparatuses mentioned above. More specifically, the terminal G provides a fan control signal. The terminal Y1 provides a cooling control signal. The terminal W1 provides a heating control signal. The terminal C provides a common or ground connection. The scope of the present invention also includes the provision of additional or different control signal terminals depending upon the nature of the apparatuses or devices to be controlled.

The thermostat electronics preferably include protection circuitry designed in consideration of the interface between the microprocessor U1 and the devices to be controlled thereby. Such protection circuitry includes the switching regulator U5 as well as the discrete circuit elements which include, but are not limited to, triacs Q1–3, 6, 7. The thermostat electronics are powered by a power source through the line voltage adapter available at the region to be controlled.

All of the extensive functionality of the programmable thermostat described in the section titled PROGRAMMABLE THERMOSTAT SCHEMATICS AND OPERATION SHOWN IN FIGS. 3–11 is available through the thermostat components shown in FIG. 2 and assembled on the four layer circuit board 100 of FIG. 12 and 13.

PROGRAMMABLE THERMOSTAT SCHEMATICS AND OPERATION SHOWN IN FIGS. 3–11

Handheld transmitter programming units are not shown in the Figures but comprise a wireless transmission device described below and enables programming of the programming device through wireless interaction with a fixed controller device. It is a further improvement that the programming device may eliminate temperature sensing means, such means being necessarily located on each fixed controller device.

Figure 11:
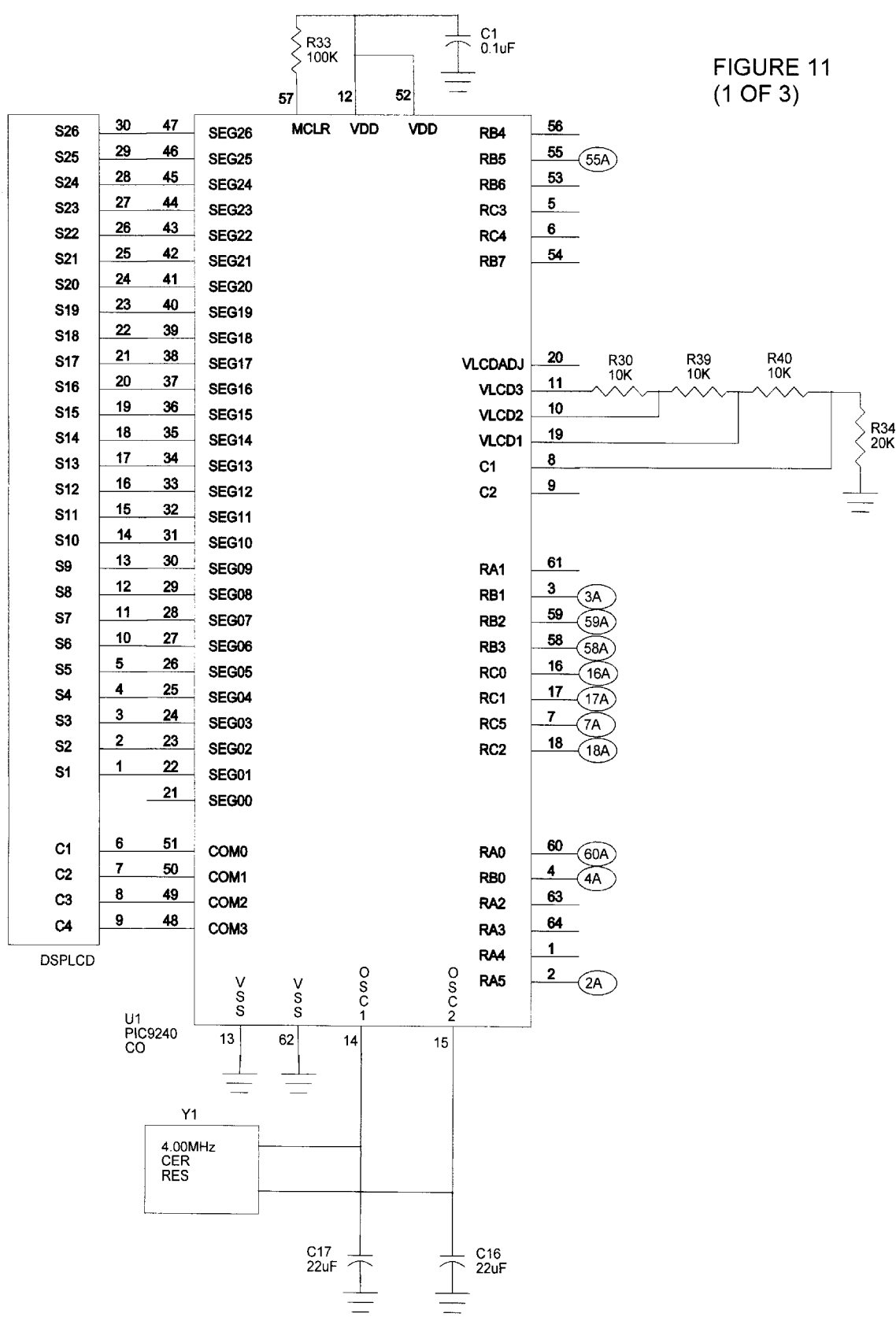
FIG. 11 shows a partially cut away view of the assembled bottom edge of the cover plate of FIG. 1A with the four layer circuit board of FIGS. 12 and 13 exposing the temperature sensing component within the cover plate extension with a cutaway view of the sealing means between the front face of the circuit board and the back face of the cover plate.
Figure 11:
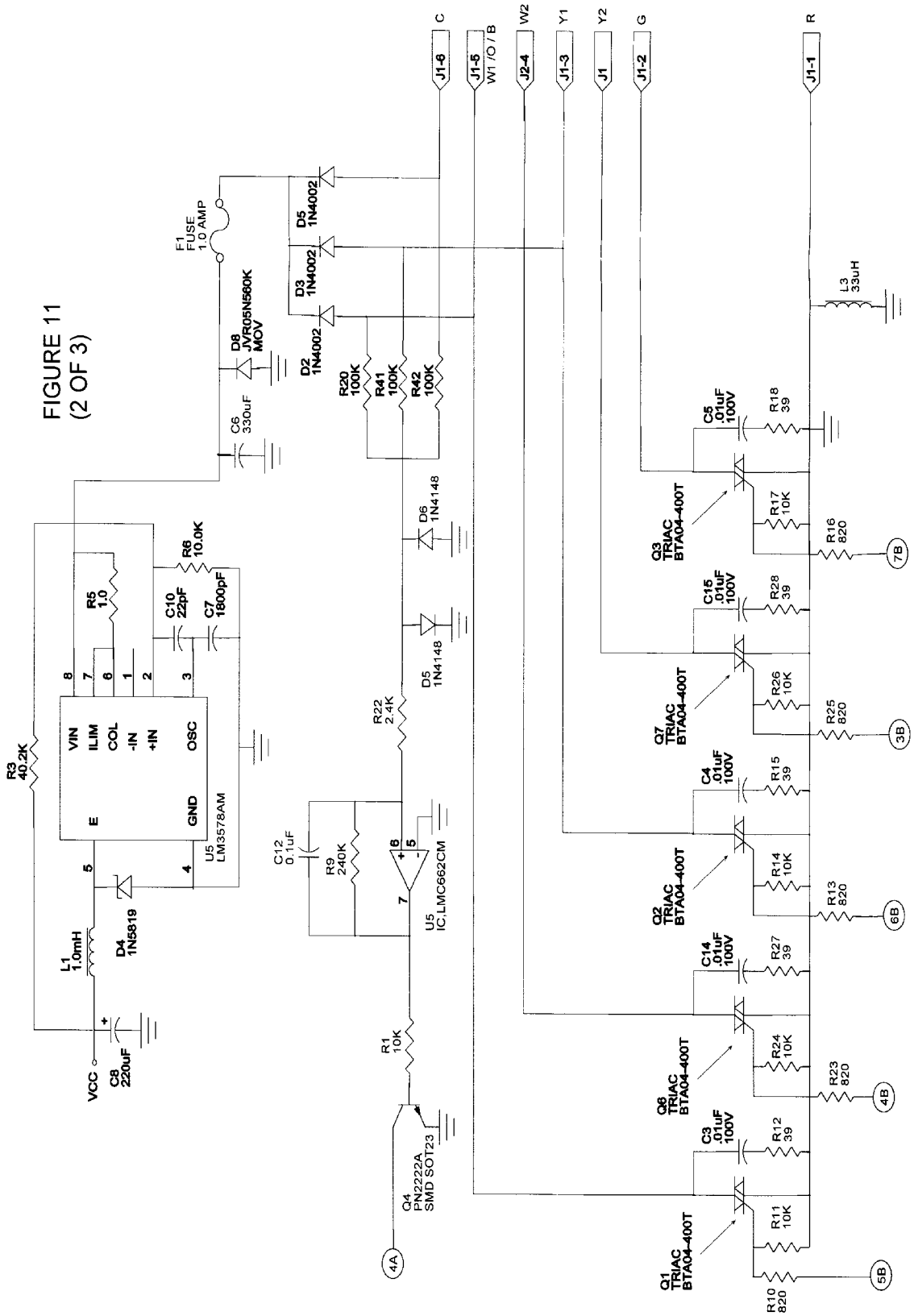
Figure 11:
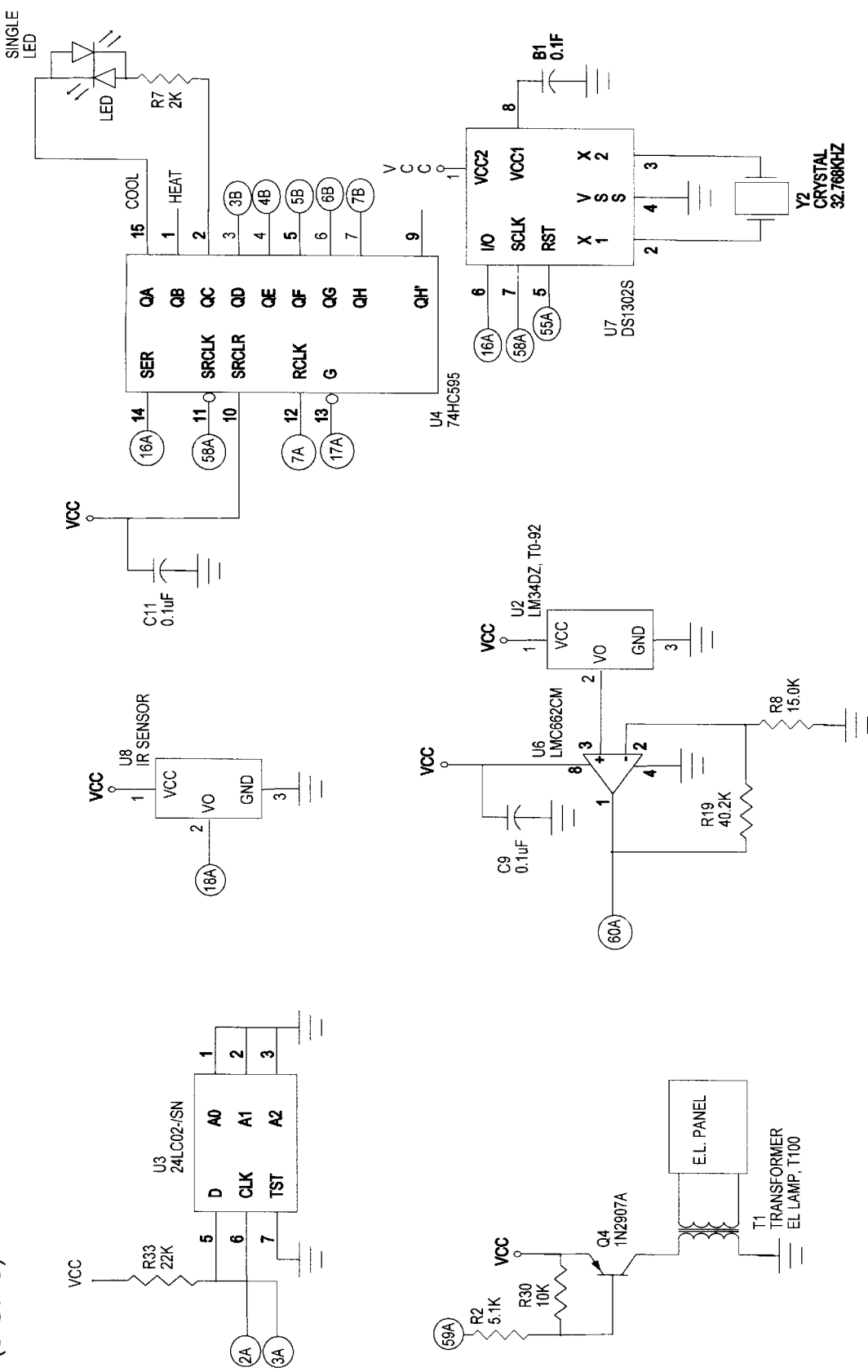

The handheld, continuous transmission wireless programmable digital thermostat system includes at least a plurality of fixed receiver controller devices. Each controller device includes a housing formed, for example, from a light-weight plastic, further preferably comprising vents for convective air flow over temperature sensing means. The controller devices also include controller electronics shown in FIG. 11 are fitted within the housing. The controller electronics include an IR sensor U8 and is preferably, but not necessarily, mounted within the housing beneath window 204A in a position sufficient to send and/or receive IR signals to a programming device.

Figure 3:
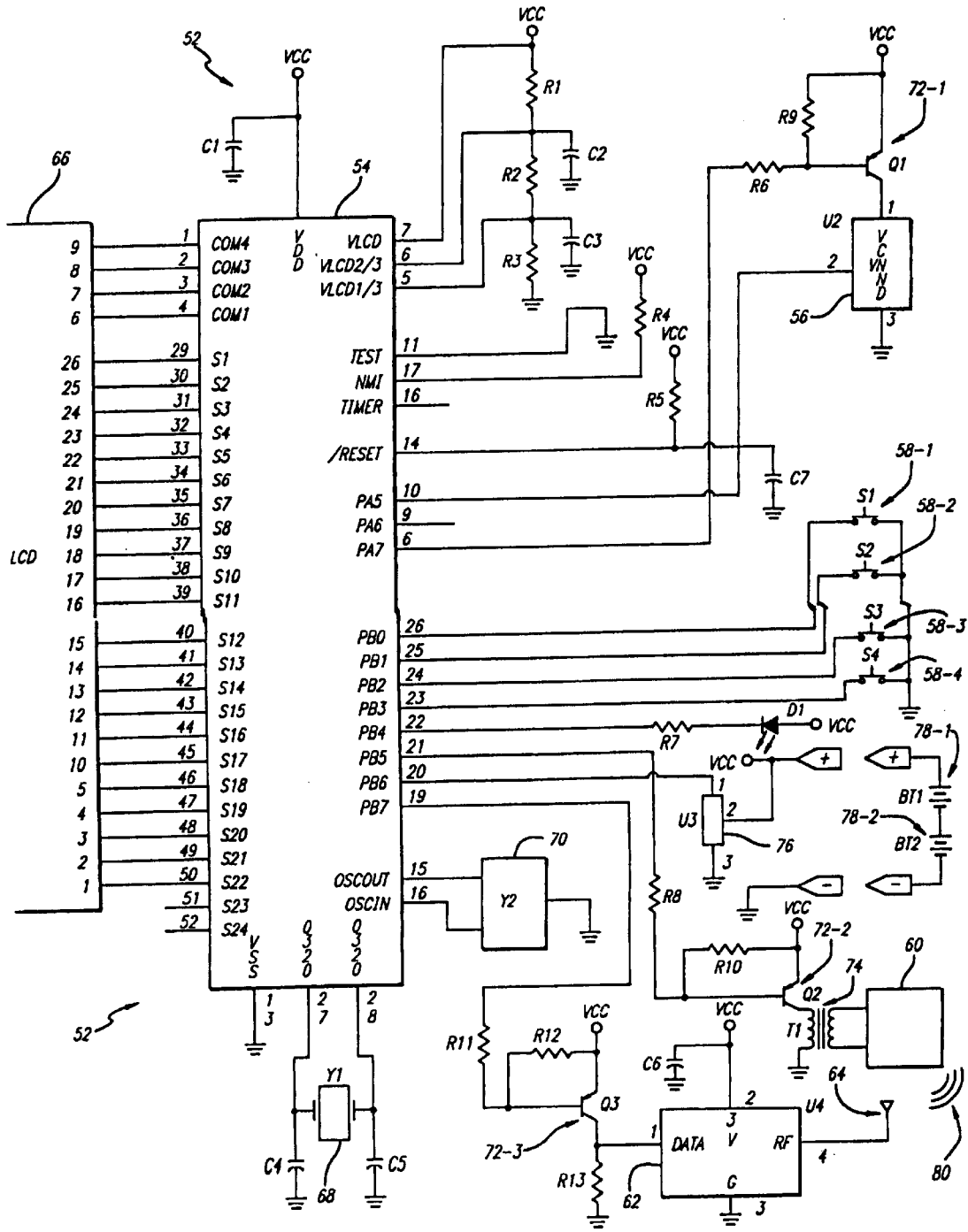

Each programming device with a set of most features and functions such as devices 100A include transmitter electronics which are shown in schematic form in FIG. 3. Generally, the transmitter unit electronics 52 receive and process user inputs from the handheld device to generate wirelessly transmitted program input signals to the controller devices, either discretely in steps in the case of interactive programming for the programming device or with continuous transmission of a plurality of program parameters. According these objects, some of the input signals to the programming devices are transmitted and/or stored in the memory of the programming device and others are supplied to the display 38. The user inputs, as determined by actuations of the user input mechanisms, are provided to the transmitter electronics 52. The user inputs may also be provided wirelessly in wireless microprocessor 54, a temperature sensor 56, switches 58I, 58-2, 58-3, 58-4, a lamp 60, a transmitter 62 and an antenna 64. An exemplary microprocessor 54 is the ST6245 manufactured by SGS Thompson. The display 38 includes a liquid crystal display (LCD) 66 which is electrically connected to the microprocessor 54 as shown. A crystal 68 and a ceramic resonator 70 are also electrically connected to the microprocessor 54 as shown. The crystal 68 preferably operates at 32.768 kHz and the ceramic resonator preferably resonates at 2.00 MHz. As may be readily appreciated, other timing or clocking schemes can be employed. The microprocessor 54 is also electrically connected to the temperature sensor 56 via a transistor 72-1 which, for example, comprises a 2N2907A transistor. The lamp 60 is electrically connected to the microprocessor 54 via a similar transistor 72-2 and a transformer 74 as shown. The transmitter 62 is connected to the microprocessor 54 via a transistor 72-3. The transmitter electronics 52 additionally include a voltage detector 76 connected to the microprocessor 54 as shown. The temperature sensor 56, transmitter 62 and voltage detector 76 respectively comprise, for example, an AD22103KT temperature sensor manufactured by Analog Devices, an HX-1003-1 transmitter manufactured by RF Monolithics and a TC54VC2902ECB voltage detector manufactured by Telcom. An exemplary LCD 66 comprises a BT-142ZAS manufactured by PICVUE.

The switches 58-1, 58-2, 58-3, 58-4 are mechanically connected to the fan button 50, mode button 48, down button 46 and up button 44, respectively. Although the preferred buttons 44, 46, 48, 50 comprise rubber buttons with carbon switching materials, other user input mechanisms can be employed. For example, the programming devices could be modified to transmit or receive infrared, wireless, optical, voice or other user inputs facilitating the desired switching at the input ports of the microprocessor 54 to the microprocessor 54 by batteries 78-1, 78-2 which comprise, for example, 1.5 volt, M cell batteries electrically connected via the voltage detector 76 as shown.

The thermostat electronics for the controller device with a digital display are described below with the understanding that they are generally illustrative of a low power programmable thermostat. Several aspects of the thermostat electronics are not described in detail, being understood by the skilled person with reference to FIG. 11, to comprise an optimized version of such a device.

A display DSPLCD, corresponding to display 201A in FIG. 2A, comprises for example, a liquid crystal display with a Thermoglow backlight. Non-wireless user input mechanisms are preferably eliminated from the controller devices, as indicated by the lack of input buttons on the exterior of devices 200A and 2008. The interactive programming aspects of the present invention are implemented via the aforementioned user input mechanisms and are described below in greater detail.

Some of the input signals are processed by the programming circuitry and others are supplied to the display DSPLCD. The user inputs, as determined by actuations of the user input mechanisms, are provided to the FIG. 3 electronics. The wireless user inputs may also be provided to microprocessor U1, a temperature sensor U2, a lamp SINGLE LED. The display DSPLCD includes a liquid crystal display 201A which is electrically connected to the microprocessor U1 as shown. A crystal Y2 and a ceramic resonator Y1 are also electrically connected to the microprocessor U1 as shown. The crystal Y2 preferably operates at 32.768 kHz and the ceramic resonator preferably resonates at 4.00 MHz. As may be readily appreciated, other timing or clocking schemes can be employed.

The microprocessor U1 is also electrically connected to the temperature sensor U7 via a microprocessor U6A. The lamp EL PANEL is electrically connected to the microprocessor U1 via a transistor Q4 and a transformer T1 as shown. The integrated circuit U3 is connected to U1 as shown.

The thermostat may include various combinations of environmental control apparatuses selected from a group comprising, for example, a heater, an air conditioning unit, a fan and heat pump. In the illustrated embodiment, the microprocessor U1 is programmable to expect an electric heat data bit and a heat pump data bit and, in a thermostat including an electric heater and a fan, a data bit is set such that the fan turns on instantly when heat is called for. In a thermostat including a single stage heat pump, a data bit is set such that the control signals generated by the microprocessor U1 are appropriately modified to accommodate a fan, compressor and reversing valve. Thus. another aspect of the present invention is the configurability of the thermostat. It should be appreciated that the thermostat can be modified to control additional and/or other apparatuses and devices such as a two-stage heat pump can be alternatively employed. Exemplary operating modes for the thermostat are discussed below in greater detail.

As shown in FIG. 11, the electronics also include control signal terminals R, C, W1/O/B, W2, Y1, Y2 which are electrically connected to the environmental control apparatuses mentioned above. More specifically, the terminal G provides a fan control signal. The terminal Y1 provides a cooling control signal. The terminal W1 provides a heating control signal. The terminal C provides a common or ground connection. The scope of the present invention also includes the provision of additional or different control signal terminals depending upon the nature of the apparatuses or devices to be controlled.

The thermostat electronics preferably include protection circuitry designed in consideration of the interface between the microprocessor U1 and the devices to be controlled thereby. Such protection circuitry includes the switching regulator U4 as well as the discrete circuit elements which include, but are not limited to, triacs Q1–3, 6, 7.

FIG. 4 illustrates an exemplary configuration of display fields within the display 38. Each display field preferably, but does not necessarily, occupy a predetermined portion of the display 38. Stated otherwise, the display 38 is preferably partitioned into nonoverlapping portions which are each dedicated to providing a predetermined visual indicia of a user programming input or a monitored environmental condition of interest. In so partitioning the display 38, portions of the LCD 66 are selectively activated by the microprocessor 54 of the transmitter unit 24.

In the exemplary illustrated embodiment, the display fields include a mode indication display field 110 which includes "HEAT", "OFF", "COOL" and "AUTO" sub-fields. One of the aforementioned sub-fields is activated depending upon which operating mode for the controlled apparatuses is selected. When the sub-field "HEAT" is activated, this provides the user with a visible indication that a heating operation has been selected. When the sub-field "COOL" is activated, the user is provided with a visible indication that a cooling operation has been selected. When illuminated, the sub-field "AUTO" provides an indication that the system will automatically changeover between heat and cool modes as the temperature varies. When the sub-field "OFF" is activated, this indicates that the entire system is turned off.

The plurality of display fields also include a program indication display field 112 which indicates the status of a stored timer program, the operation of which is described below in greater detail. When the sub-fields "Program" and "On" are both activated, this provides the user with an indication that stored programming is currently being executed. When the subfields "Program" and "Off" are both activated, the stored timer programming is not currently being executed.

Various data and/or monitored environmental conditions of interest are also presented in the form of visible indicia. Thus, the exemplary illustrated display 38 further comprises a clock display field 114 with "[hours]: [minutes]", "Am" and "Pm" sub-fields as shown in FIG. 4. The display fields also include a temperature display field 116 and a battery low indication display field 118. The clock display field 114 preferably shows the current time and is used to program the timer periods as discussed below with reference to the user programming aspects of the present invention. The temperature display field 116 shows the current temperature as measured by the temperature sensor 56.

As shown in FIG. 4 a desired set temperature display indication of the desired temperature set by a user of the system 20. The displays fields also include a setback indication display field 122, a setup indication display field 124, a fan operation indication display field 126 and a timer period indication display field 128. The setback indication display field 122 includes sub-fields "Setback", "1" and "2" and indicates features pertaining to setback programming which is discussed below with reference to FIG. 8. The setup indication display field 124 includes a "Setup" sub-field and is discussed below with reference to FIGS. 5 and 9. The fan operation indication display field 126 includes "FAN ON" and "FAN AUTO" sub-fields and is discussed below with reference to FIG. 7.

The timer period indication display field 128 "Day", "Evening" and "Night" subincludes "Morning", fields and is discussed below with reference to FIGS. 10A–10C.

A program executed by the microprocessor 54 provides an interactive programming interface which facilitates remote programming according to a plurality of programming modes of varying complexity. In a preferred embodiment, the plurality of programming modes comprise a basic programming mode, an economy programming mode and an advanced programming mode. Although all of the aforementioned programming modes may be implemented within a single computer executable program stored within or accessible to the microprocessor 54, they (and other executable program features) will hereinafter be referred to as "modules". Furthermore, it should be understood that each of the programming and/or control features described below can be implemented as a separate computer executable program, combined into several can also include an input port to facilitate uploading revised or updated versions of the executable program(s).

FIG. 5 shows the display 38 of the transmitter unit 24 during execution of a quick start software module by the microprocessor 54. Execution of the quick start software module begins when a user of the transmitter unit 24 presses both the mode button 48 and the fan button 50 simultaneously for some predetermined duration of time, e.g., two seconds. The clock display field 114 is first activated and, in the preferred embodiment, flashes while the time is being set up until the mode button 48 is pressed again indicating that the user wishes to enter the set time. The up button 44 and the down button 46 are selectively pressed to adjust the time in predetermined time increments such as 30 minute increments. It is further contemplated that the quick start software module may be modified such that the speed of transition from one time increment to the next differs depending upon how long either of the buttons 44, 46 is depressed. The transmitter unit 24 interactively prompts the user to provide other user inputs pursuant to a basic programming mode as discussed below with reference to FIG. 6. After screens by, for example, continuously pressing both the mode button 48 and the fan button 50 for two seconds.

Figure 6:
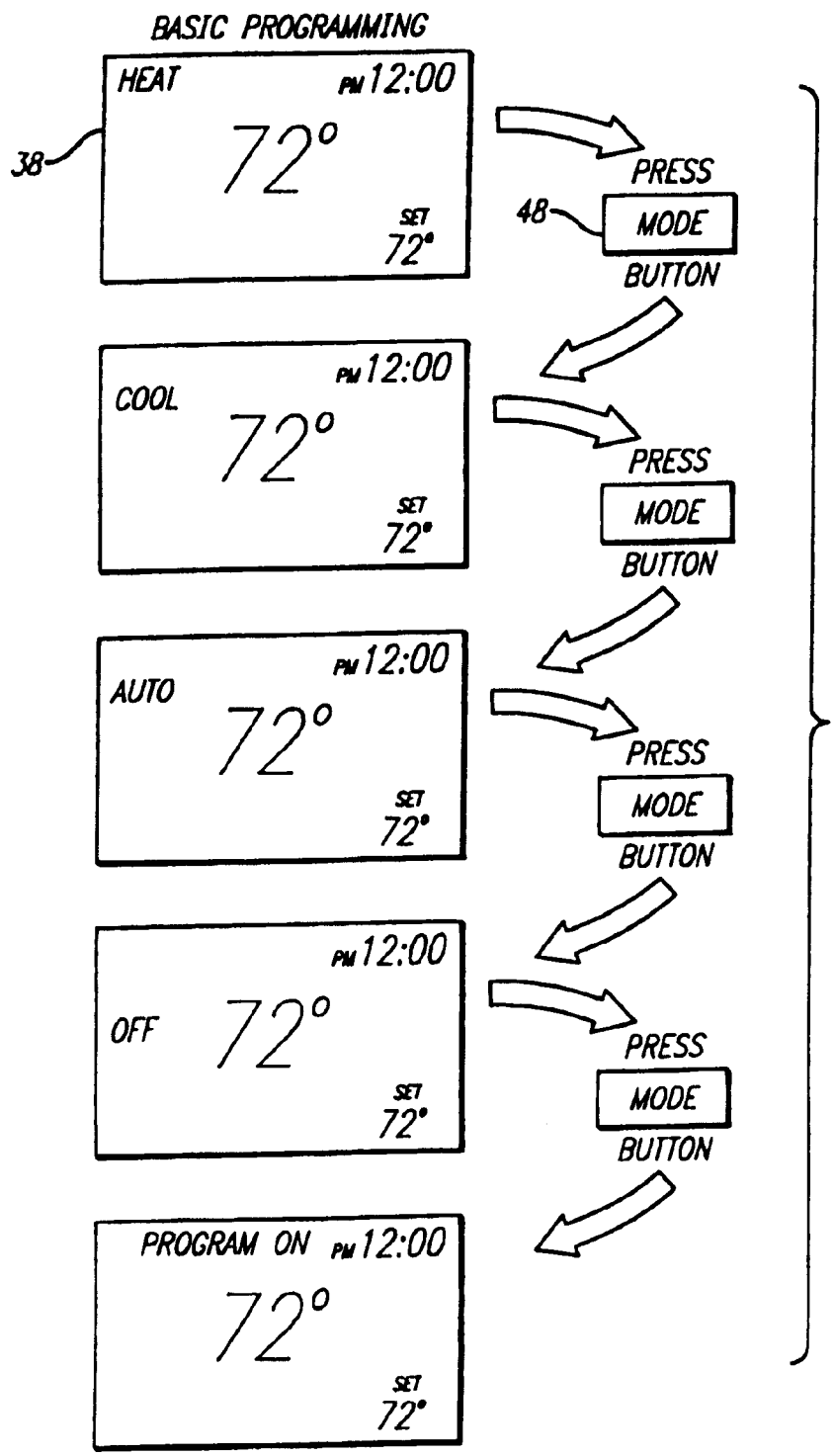

FIG. 6 shows the display 38 of the transmitter unit 24 during execution of a basic programming mode software module by the microprocessor 54. During execution of the basic programming mode software module. the up button 44 and the down button 46 are employed to set a desired temperature for a particular operating mode (to be distinguished from programming mode). The operating modes include a HEAT mode, a COOL mode, an AUTO mode and an OFF mode. During the HEAT mode, the microprocessor 54 generates and controls the transmission of input signals which are received by the receiver/controller unit 22 which processes the input signals to generate control signals which are, in turn, provided to a heating apparatus such as a furnace. During the COOL mode, the receiver/controller unit 22 provides the control signals to a cooling apparatus such as an air conditioner. During the AUTO mode, control signals are automatically provided to both a heating apparatus and a cooling apparatus depending upon the desired temperature set by the user and a measured temperature in the environment to be controlled. The present invention additionally contemplates program modifications to facilitate temperature sampling enhancements, averaging, etc.

Transitions between the aforementioned operating modes are controlled by pressing the mode button 48. Once a desired operating mode has been selected and a desired temperature entered via appropriate manipulation of the up and down buttons 44, 46, the user exits from the setup screens by simultaneously pressing the mode button 48 and the fan button 50 as discussed above with regard to FIG. 5. The bottom portion of FIG. 6 shows that the mode button 48 is also employed to initiate execution of stored four time period operation, an advanced programming mode feature which is described below in greater detail with FIG. 7 shows the display 38 of the transmitter unit 24 during execution of a fan operation control software module by the microprocessor 54. Execution of the fan operation control software module begins when a user of the transmitter unit 24 presses the fan button 50 for a predetermined period of time thereby activating the fan operation indication display field 126. As shown in FIG. 7, a user may alternatively select between one of two different fan operating modes by employing the fan button 50. The fan operating modes include a FAN AUTO mode and a FAN ON mode. The microprocessor 54 generates and controls the transmission of input signals which vary depending upon which fan operating mode is selected. The controller device receives and processes the input signals to generate control signals which are, in turn, provided to a fan or similar apparatus. When the FAN AUTO mode is selected, the fan turns on only when there is a demand for heating or cooling. When the FAN ON mode is selected, the fan runs continuously.

FIG. 8 shows the display 38 of the transmitter unit 24 during execution of an economy programming mode software module by the microprocessor 54. The preferred controller 86 at the receiver/controller unit 22 is programmed to operate according to two setback protocols which are designed to save energy. More specifically, the setback protocols are used during times when climate control adjustments are less frequently needed such as during sleep and away periods. The precise nature of these setback protocols is determined by the user who employs the economy programming mode software module to remotely establish the setback protocols. In a preferred thermostat system 20, the setback protocols can only be activated when the operating mode is HEAT, COOL or AUTO.

FIG. 8 illustrates how a first setback protocol (designated "Setback 1") is established. A user initiates execution of the economy programming mode software module button 48 for a predetermined amount of time. The user then uses the up and down buttons 44, 46 to select one of a predetermined group of temperature offsets (e.g., 5, 10, 15 or 20 degrees Fahrenheit) which is displayed at an offset temperature display field 130. During economy operation, a furnace or air conditioner will not turn on until the room temperature reaches the set temperature plus or minus the offset temperature. Once the desired offset temperature is selected, the mode button 48 is pressed to advance to the next two economy programming steps where start and stop times for the first setback protocol are similarly selected. A second setback protocol is established in identical fashion.

As illustrated at the bottom of FIG. 8, the program indication display field 112 provides an indication of whether or not a particular setback protocol is turned on. As with the other user inputs, the up and down buttons 44, 46 are employed to toggle the setback protocols between on and off operating statuses. When a user has finished programming the setback protocols, normal operation is resumed by simultaneously pressing the up button 44 and the mode button 48 for a predetermined amount of time. Conversely, economy programming can be turned on during normal operation by holding down the fan button 50 while pressing the up button 44. As may be readily appreciated, the microprocessor 54 can be programmed to respond in the same manner to different combinations of actuated user input mechanisms.

Figure 9:
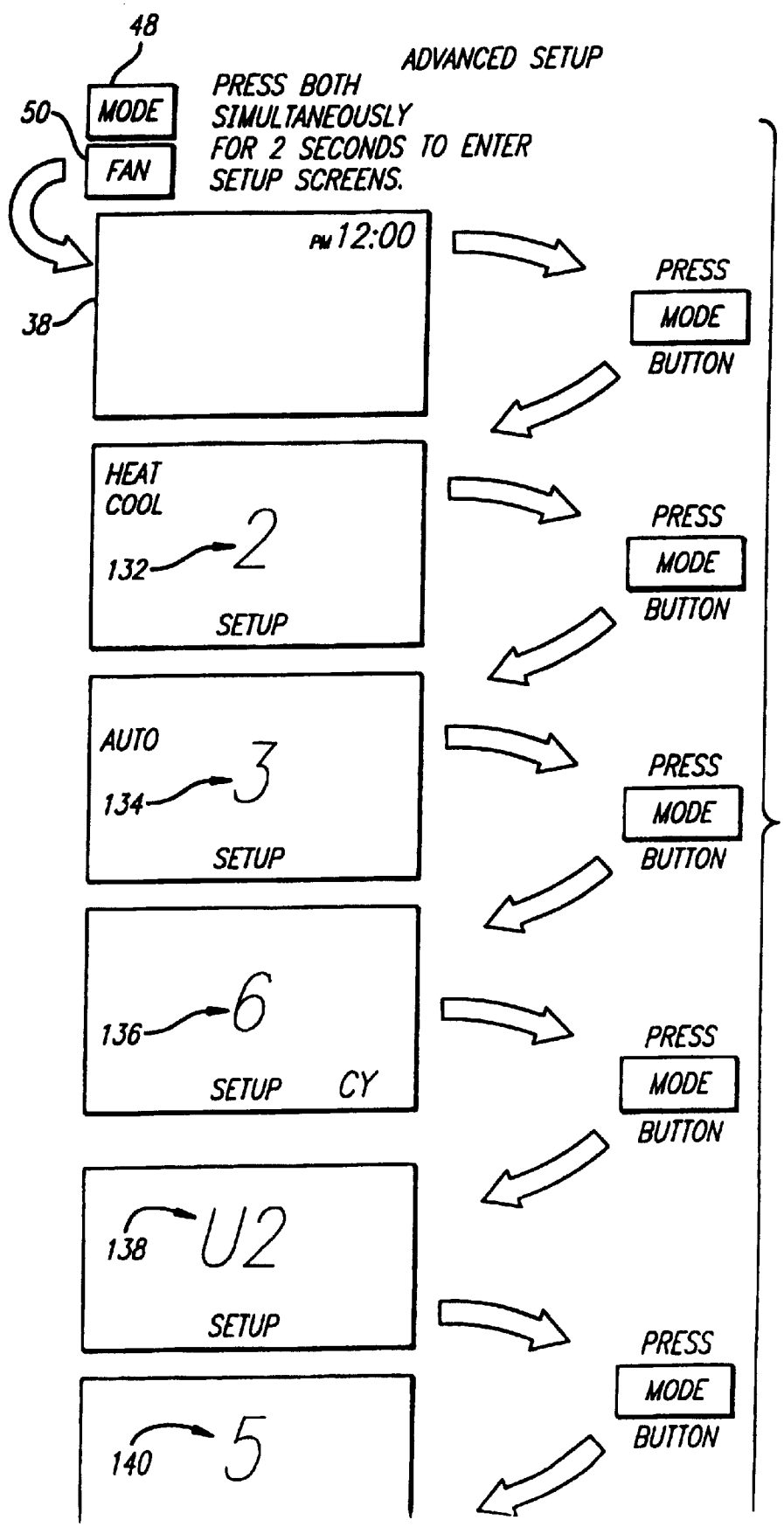

FIG. 9 shows the display 38 of the programming device during execution of an advanced programming setup software module by the microprocessor 54. A user initiates execution of the advanced programming setup software module by simultaneously pressing the mode button 48 and the fan button 50. First, the user is given an opportunity to adjust the time which is shown in the clock user inputs) are entered by pressing the mode button 48.

After the selected time is entered, the advanced programming setup software module provides control signals to the display 38 to present the user with an interactive display including a manual mode temperature swing display field 132. The manual mode temperature swing is the difference in temperature the room has to be from the desired set temperature to turn on heat or cool when the system 20 is operating in the HEAT or COOL manual operating modes, respectively. For example, a setting of "2" will not allow the heat to turn on until the room temperature is 2 degrees colder than the desired set temperature. Although an exemplary default manual mode temperature swing is 2 degrees (i.e., factory setting), this can be adjusted by employing the up and down buttons 44, 46. An exemplary range of temperature swing adjustment for the manual mode is 1–6 degrees, adjustable in one degree increments. other ranges and increments of temperature swing adjustment can be employed. Furthermore, it is contemplated that separate temperature swings could be provided for each of the manual modes.

After the temperature swing for the manual mode is entered, the advanced programming setup software module provides control signals to the display 38 to present the user with an interactive display including an automatic mode temperature swing display field 134. The automatic mode temperature swing is the difference in temperature the room has to be from the desired set temperature to turn on heat or cool, depending upon which is needed, when the system is operating in the AUTO operating mode. As shown in FIG. 9, an exemplary default automatic mode temperature swing is "3". A preferred range of temperature swing adjustment for the automatic mode is also 1–6 degrees, adjustable in one degree increments.

After the temperature swing for the automatic mode is provides control signals to the display 38 to present the user with an interactive display including a heating cycles per hour display field 136. The number of heating cycles entered limits the heater's on/off cycles per hour. As shown in FIG. 9, an exemplary default maximum number of heating cycles per hour is "6". A preferred range of adjustment for the maximum number of cycles per hour is 2–6 cycles, adjustable in one cycle increments.

After the number of heating cycles per hour is entered, the advanced programming setup software module provides control signals to the display 38 to present the user with interactive displays including a transmitter unit identification (ID) display field 138 and a house number display field 140. The transmitter unit ID and house number are likewise adjustable by pressing the up and down buttons 44, 46. To return to normal operation, the user presses the mode button 48 and the fan button 50 simultaneously for a predetermined period of time.

Figure 10A:
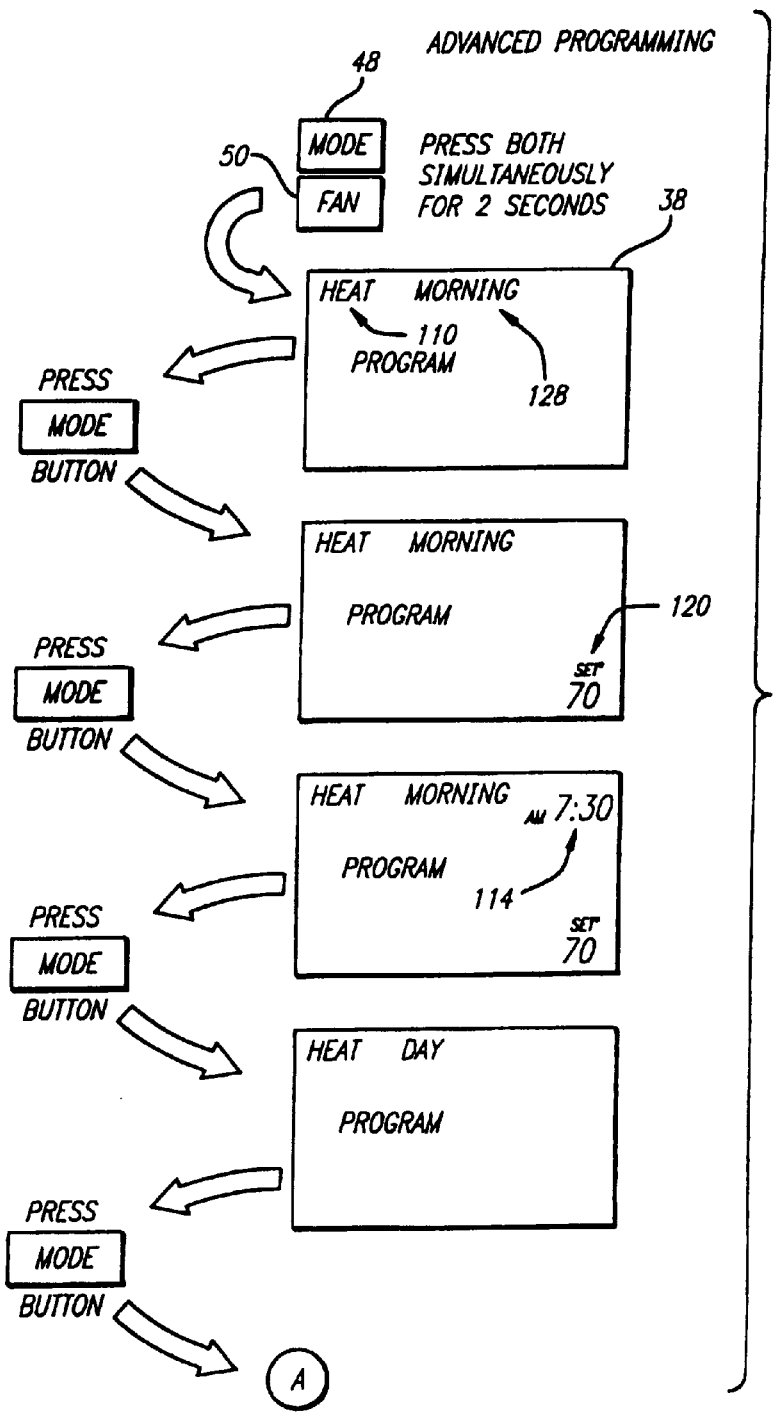
FIGS. 10A–10C show the display portion of the transmitter unit during execution of an advanced programming mode software module.
Figure 10B:
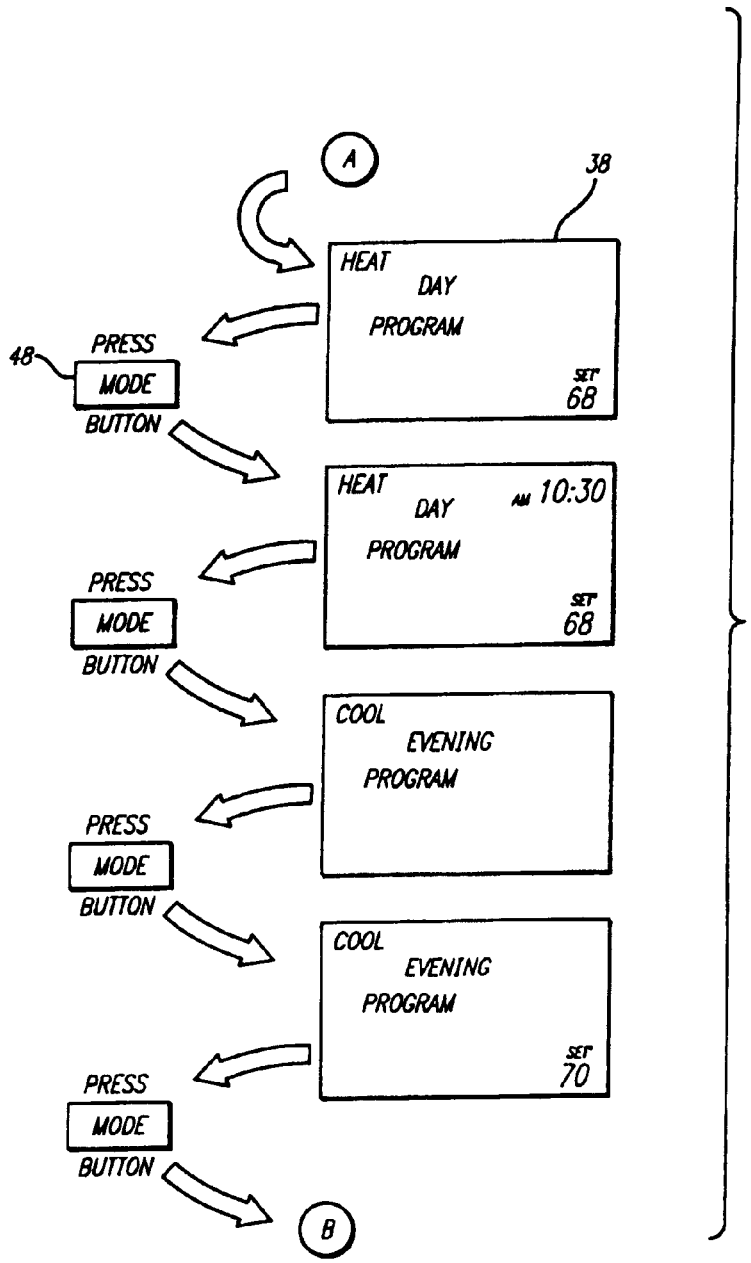
Figure 10C:
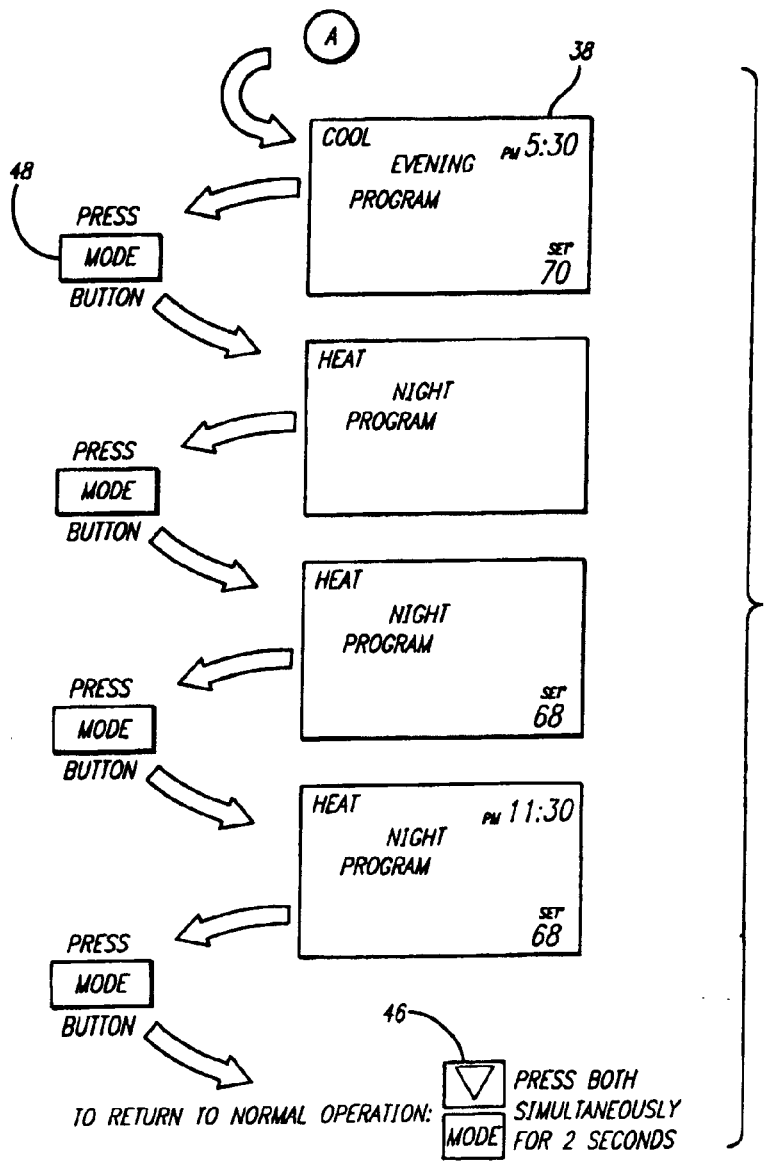

FIGS. 10A–10C show the display 38 of the programming device during execution of an advanced programming mode software module by the microprocessor 54. The advanced programming mode offers a user friendly, interactive display which serves to simplify an otherwise potentially confusing programming task. More specifically, the advanced programming mode provides a "multiple time period" programming feature. In the illustrated exemplary embodiment, the multiple time periods comprise morning, day, evening and night. Sub-fields of the timer period indication display field 128 are selectively activated depending which step of the advanced programming mode software module is currently being executed.

Referring to FIG. 10A, the up and down buttons 44, 46 are first employed by the user to select between one of the HEAT and COOL operating modes for use during the morning time period. The HEAT operating mode is shown as selected by illumination of the HEAT sub-field within the mode is entered for the morning time period, the advanced programming mode software module provides control signals to the display 38 to present the user with interactive displays which show a morning set temperature within the desired set temperature display field 120 and a morning start time within the clock display field 114. The user adjusts the morning set temperature and the morning start time as desired. Operating modes, set temperatures and start times for the day, evening and night time periods are thereafter entered by the user in response to substantially identical sequences of user prompts provided at the display 38. To return to normal operation, the user presses the down button 46 and the mode button 48 simultaneously for a predetermined period of time.

The microprocessor 54 of the programming device generates and manipulates a variety of control variables associated with each of the programming modes and, preferably, is programmed to facilitate automatic adjustments in the control variables as appropriate. For example, various timers are implemented to generate the control signals while the thermostat system is operating in the AUTO operating mode. Also, control variables relating to a desired operating mode need to be periodically updated when time period programming has been activated. By way of example and not of limitation, the transmitters and receivers each weigh only a few ounces, and less than a pound, and may have dimensions such as 5 inches by 3 inches by 1½ inches or less.

It has been described above that a relatively extensive set of program parameters may be stepwise input by a user to a programming device and wirelessly transmitted to a controller device. The effort to duplicate this effort at a plurality of control devices in an industrial installation is critical although, with the devices of the prior art, takes substantial time and is filled with potential for by mistake or intentionally allowing different settings in different control device locations. Energy savings in balance with personnel comfort are most easily planned when the same control program and parameters are used where needed.

In a preferred transmission mode, a programming device will contain by default or previous programming inputs all the desired parameters necessary to control all functions of the controller device. As an example, the above steps of setting time and temperature related data for the Basic mode have been completed and exist in the memory of the programming device although not in a controller device. This programming may have been accomplished with a programming device 100A with a display device or as in devices 100B–100D with the assistance of a device 200A or an "office" dummy controller device not connected as a controller, but made available to a management personnel for programming the programming devices 100B–100D, whereby the programming device may be given to a menial, lower paid employee to take into the industrial installation for transmission of the program parameters to the controller devices therein. The programming device carrying untransmitted program parameters is then preferably directed by hand with the IR sensors of the programming device and the controller device in operative distance of each other. A portion of the resident programming in the programming device comprises instructions and means, upon access through the user input devices as described above (or more preferably, to provide a separate button on the programming device housing for wireless transmission of a plurality of program parameters), to continuously transmit through the IR sensor of the programming device all or at least a plurality of the program parameters for a desired program or mode. Where less than all the parameters are transmitted, the resident programming in the programming device comprises instructions and means whereby comparison is made with a previous set of stored program parameters and only those that have changed since the last wireless transmission are sent to the controller device. Limited transmission reduces necessary transmission time and reduces the chance that errors in transmission will be introduced.

Upon receipt of transmission of at least two or up to a full set of program parameters from the programming device, the controller device responds with a short flashing of the LED 202A to indicate to the person holding the programming device that the transmission was received. Where a full set of program parameters are to be received by the controller device from the programming device, a comparison of the number of parameters received with the number of program parameters will indicate whether a complete transmission was received. An audible or visual (as with LED 202A) will alert the person holding the programming device that an incomplete transmission was made and should be repeated.

As another method for checking transmission error both the programming device and the controller device comprise wireless receiving and transmitting means. whereby the controller device, after receiving at least a plurality of program parameters, re-transmits those parameters to the programming device for comparison with the originally transmitted parameters. If an error is detected, the programming device comprises means for alerting the person holding the programming device that an error in transmission has occurred, either with an audible or visual (as with LED 42) signal, It will be another embodiment of the present invention to provide a greater number of buttons on the programming device, albeit providing programming and electronics sufficient for an expanded user interface. The additional buttons will provide for quickness in programming and operation, i.e., a set of buttons as shown in FIGS. 1A–1D, additionally including the following:

| BUTTON LABEL | BUTTON FUNCTION |
| --- | --- |
| HEAT | Access heating control program. |
| COOL | Access cooling control program. |
| NEXT | Access another program parameter. |
| SETUP | Access the "Setup" program. |
| RESTORE DEFAULTS | Resets transmittable parameters to defaults. |
| CALIBRATE | Access calibration program. |
| MEMORY | Access memory contents. |
| BLASTER | Transmit plurality of program parameters from the programming device to the controller device in a continuous transmission. |

The above design options will sometimes present the skilled designer with considerable and wide ranges from which to choose appropriate apparatus and method modifications for the above examples. However, the objects of the present invention will still be obtained by that skilled designer applying such design options in an appropriate manner.

We claim:

1. An installed reduced profile programmable thermostat comprising:
    (a) a cover plate and circuit board assembly comprising a cover plate and at least one circuit board;
    (b) a backside of the cover plate being integral with and functionally adjacent to a front side of a first circuit board comprising thermostatic control circuit elements, such backside of the cover plate having top and side edges that are adapted to extend substantially beyond top and side edges of the first circuit board, such further extension of the backside of the cover plate top and side edges further adapted to supportively engage and oppose a mounting wall; and
    (c) a thermostat opening formed in a substantially flat mounting wall with an outside surface, the further extension of the backside of the cover plate top and side edges supportively pressed by support means to the outside surface adjacent to the thermostat opening such that a front side of the cover plate displays at least one or more aspects of the programmable thermostat and visually covers the thermostat opening and the first circuit board is located behind the plane of the outside surface.

2. The installed thermostat of claim 1 wherein the circuit board or boards are adapted to comprise substantial thermostatic programming functionality.

3. The installed thermostat of claim 1 wherein most of the front side of the cover plate extends laterally or normally from the outside surface of the mounting wall up to less than or equal to about 0.5 inches.

4. The installed thermostat of claim 1 wherein most of the front side of the cover plate extends laterally or normally from the outside surface of the mounting wall up to less than or equal to about 0.25 inches.

5. The installed thermostat of claim 4 wherein a substantially smaller portion of the front side of the cover plate extends outwardly to a temperature sensor opening adapted to form therebeneath a cavity for protection of a temperature sensing component.

6. The installed thermostat of claim 5 wherein the temperature sensor opening comprises a vertically slotted opening, such vertical slots adapted to permit natural convection of air adjacent to the front side of the cover plate to pass over the temperature sensing component.

7. The installed thermostat of claim 6 wherein sealing means seal from the backside of the cover plate to the front side of the first circuit board about the temperature sensing component such that substantially only air adjacent to the front side of the cover plate flows across the temperature sensing element.

8. The installed thermostat of claim 1 wherein only one four-layer circuit board is used in the programmable thermostat adapted to comprise substantial thermostatic programming functionality.

9. The installed thermostat of claim 1 wherein the visible aspects of the programmable thermostat comprise an opening for a temperature sensing component and a protective covering for receiving wireless transmission of a thermostat control program.

10. The installed thermostat of claim 1 further comprising a standard single switch box support means with a front opening located adjacent to a backside surface of or at least partially extending through the thermostat opening, the cover plate further comprising a height and width about that of a standard single switch plate and the first circuit board has a height and width less than that of the front opening of a standard single switch box support means, the cover plate and circuit board assembly being supportively connected with the standard single switch box support means.

11. An installed reduced profile programmable thermostat comprising:
    (a) a cover plate and circuit board assembly comprising a cover plate and at least one circuit board;
    (b) a backside of the cover plate being integral with and functionally adjacent to a front side of a first circuit board comprising thermostatic control circuit elements, such backside of the cover plate having top and side edges that are adapted to extend substantially beyond top and side edges of the first circuit board, such further extension of the backside of the cover plate top and side edges further adapted to supportively engage and oppose a mounting wall; and
    (c) a thermostat opening formed in a substantially flat mounting wall with an outside surface, the further extension of the backside of the cover plate top and side edges supportively pressed by support means to the outside surface adjacent to the thermostat opening such that a front side of the cover plate displays at least one or more aspects of the programmable thermostat and visually covers the thermostat opening and the first circuit board is substantially located beyond a backside of the mounting wall without an enclosing housing.

12. The installed thermostat of claim 11 wherein the circuit board or boards are adapted to comprise substantial thermostatic programming functionality.

13. The installed thermostat of claim 11 wherein most of the front side of the cover plate extends laterally or normally from the outside surface of the mounting wall up to less than or equal to about 0.5 inches.

14. The installed thermostat of claim 11 wherein most of the front side of the cover plate extends laterally or normally from the outside surface of the mounting wall up to less than or equal to about 0.25 inches.

15. The installed thermostat of claim 14 wherein a substantially smaller portion of the front side of the cover plate extends outwardly to a temperature sensor opening adapted to form therebeneath a cavity for protection of a temperature sensing component.

16. The installed thermostat of claim 15 wherein the temperature sensor opening comprises a vertically slotted opening, such vertical slots adapted to permit natural convection of air adjacent to the front side of the cover plate to pass over the temperature sensing component.

17. The installed thermostat of claim 16 wherein sealing means seal from the backside of the cover plate to the front side of the first circuit board about the temperature sensing component such that substantially only air adjacent to the front side of the cover plate flows across the temperature sensing element.

18. The installed thermostat of claim 11 wherein only one four-layer circuit board is used in the programmable thermostat adapted to comprise substantial thermostatic programming functionality.

19. The installed thermostat of claim 11 wherein the visible aspects of the programmable thermostat comprise an opening for a temperature sensing component and a protective covering for receiving wireless transmission of a thermostat control program.

20. An installed reduced profile programmable thermostat comprising:

(a) a cover plate and circuit board assembly comprising a cover plate and at least one circuit board;

(b) a backside of the cover plate being integral with and functionally adjacent to a front side of first circuit board, such backside of the cover plate having top and side edges that are adapted to extend substantially beyond top and side edges of the first circuit board, such further extension of the backside of the cover plate top and side edges further adapted to supportively engage and oppose a mounting wall;

(c) a thermostat opening formed in a substantially flat mounting wall with an outside surface, the further extension of the backside of the cover plate top and side edges supportively pressed by support means to the outside surface adjacent to the thermostat opening such that a front side of the cover plate displays at least one or more aspects of the programmable thermostat and visually covers the thermostat opening;

(d) the cover plate further adapted such that most of the front side of the cover plate extends laterally or normally from the outside surface of the mounting wall up to less than or equal to about 0.25 inches; and (e) a substantially smaller portion of the front side of the cover plate extends to a temperature sensor opening adapted to form therebeneath a cavity for protection of a temperature sensing component wherein the temperature sensor opening comprises a vertically slotted opening, such vertical slots adapted to permit natural convection of air adjacent to the front side of the cover plate to pass over the temperature sensing component and wherein sealing means seal from the backside of the cover plate to the front side of the first circuit board about the temperature sensing component such that substantially only air adjacent to the front side of the cover plate flows across the temperature sensing element.

* * * * *